US006868317B2

(12) United States Patent  (10) Patent No.: US 6,868,317 B2
Okuyama  (45) Date of Patent: Mar. 15, 2005

(54) STEERING CONTROL SYSTEM AND METHOD FOR WATERCRAFT

(75) Inventor: Takashi Okuyama, Hamamatsu (JP)

(73) Assignee: Yamaha Marine Kabushiki Kaisha, Shizuoka (JP)

(*) Notice: Subject to any disclaimer, the term of this patent is extended or adjusted under 35 U.S.C. 154(b) by 0 days.

(21) Appl. No.: 10/675,340

(22) Filed: Sep. 30, 2003

(65) Prior Publication Data

US 2004/0181322 A1 Sep. 16, 2004

(30) Foreign Application Priority Data

Oct. 23, 2002 (JP) ........................................ 2002-307949

(51) Int. Cl.[7] ................................................. G06F 7/00
(52) U.S. Cl. ........................... 701/21; 701/41; 701/200; 701/214; 440/53; 114/144 R; 114/162
(58) Field of Search ............................ 701/21, 41, 200, 701/214, 216; 440/53, 61 S; 114/144 A, 144 R, 162

(56) References Cited

U.S. PATENT DOCUMENTS

| 4,931,025 | A | | 6/1990 | Torigai et al. ................. 440/1 |
|---|---|---|---|---|
| 5,031,562 | A | | 7/1991 | Nakase et al. ............... 114/150 |
| 5,632,217 | A | | 5/1997 | Ford et al. .................... 114/150 |
| 6,299,493 | B1 | * | 10/2001 | Griffith et al. ................. 440/6 |
| 6,308,651 | B2 | | 10/2001 | McKenney et al. .......... 114/144 |
| 6,322,406 | B1 | * | 11/2001 | Griffith et al. ................. 440/6 |
| 6,350,164 | B1 | * | 2/2002 | Griffith et al. ................. 440/6 |
| 6,361,385 | B1 | * | 3/2002 | Bland et al. .................... 440/6 |

FOREIGN PATENT DOCUMENTS

| JP | 5-185987 | 7/1993 |
|---|---|---|
| JP | 6-26878 | 2/1994 |

OTHER PUBLICATIONS

International Standard, ISO 11783–5, First edition Jan. 5, 2001, Tractors and machinery for agriculture and forestry—Serial control and communications data network, Part 5: Network management.
Co–pending U.S. Appl. No. 10/624,204, filed Jul. 22, 2003, Takashi Okuyama, "Control Circuits and Methods For Inhibiting Abrupt Engine Mode Transitions in a Watercraft."
Toyota Camry 2000 Owner's Manual, 1999, pp. i, .95, 102–104.
NMEA 2000; Standard for Serial Data Networking of Marine Electronic Devices; Main Document; Version 1.000, Sep. 12, 2001; @NMEA 1999, 2000, 2001.
NMEA 2000; Standard for Serial Data Networking of Marine Electronic Devices; Appendix A; Version 1.000; Sep. 12, 2001; @NMEA 1999, 2000, 2001.

(List continued on next page.)

Primary Examiner—Gertrude A. Jeanglaude
(74) Attorney, Agent, or Firm—Knobbe, Martens, Olson & Bear LLP

(57) ABSTRACT

A steering system for a watercraft provides a position command signal indicative of a position of a rudder. An azimuth or location sensor senses an azimuth or a location of the watercraft, respectively. A control data input device selectively provides a control device with a manual mode signal and an autopilot mode signal. The autopilot mode signal is accompanied by a target azimuth signal or a target location signal. The control device controls the position of the rudder unit based upon the position command signal in the manual mode. The control device controls the position of the rudder unit such that the actual azimuth coincides with the target azimuth. The control device places the watercraft in the manual mode in place of the autopilot mode without the manual mode signal if the position command signal changes while the control device controls the position of the rudder unit in the autopilot mode.

27 Claims, 11 Drawing Sheets

OTHER PUBLICATIONS

NMEA 2000; Standard for Serial Data Networking of Marine Electronic Devices; Appendix B; @NMEWA 1999, 2000, 2001.

NMEA 2000; Standard for Serial Data Networking of Marine Electronic Devices; Appendix C; Version 1.000, Sep. 12, 2001, @NMEA 1999, 2000, 2001.

NMEA 2000; Standard for Serial Data Networking of Marine Electronic Devices; Appendix D; Version 1.000, Sep. 12, 2001, @NMEA 1999, 2000, 2001.

NMEA 2000; Standard for Serial Data Networking of Marine Electronic Devices; Appendix E; ISO 11783–5 Network Management.

NMEA 2000; Standard for Serial Data Networking of Marine Electronic Devices; Appendix F; ISO 11783–3 DataLink Layer.

NMEA 2000; Standard for Serial Data Networking of Marine Electronic Devices; Appendix G; ISO 11898 Controller Area Network.

* cited by examiner

STEERING CONTROL SYSTEM AND METHOD FOR WATERCRAFT

PRIORITY INFORMATION

The present application is based on and claims priority under 35 U.S.C. § 119 to Japanese Patent Application No. 2002-307949, filed on Oct. 23, 2002, the entire content of which is expressly incorporated by reference herein.

BACKGROUND OF THE INVENTION

1. Field of the Invention

The present invention generally relates to a steering control system and method for a watercraft, and more particularly relates to an improved steering control system and method that controls a rudder of a watercraft selectively using two control modes.

2. Description of Related Art

Computerized controls have become popular in recent years for watercrafts. In one arrangement, a watercraft has a propulsion device that propels the watercraft and a rudder unit that provides an advance azimuth of the watercraft. Typically, an outboard motor can be the rudder unit that incorporates the propulsion device. A computerized steering control system can be provided such that the rudder unit is manually steerable in a manual control mode and the rudder unit is automatically steerable in an automatic control mode or autopilot control mode. In the automatic control mode, a target azimuth of the watercraft may be specified, and a control device may control a direction of the watercraft such that the direction of the watercraft does not deviate from the target azimuth.

For example, some of such computerized steering control systems are disclosed in JP5-185987 and JP6-26878.

Those conventional steering control systems employ a manually-operated mode selector that selectively changes the manual control mode to the automatic mode or vice versa. In some situations, the operator may want to manually make a temporary course correction. The need for the operator to switch the mode selector from the automatic control mode to the manual control mode can be inconvenient and can delay the course correction.

SUMMARY OF THE INVENTION

One embodiment of the present invention provides a steering control system and method for a watercraft that does not require the operator to operate a mode selector switch to switch to the manual control mode from the automatic control mode. The control system in the embodiment releases or disables the automatic control mode when the operator controls a steering device such as, for example, a steering wheel and allows the operator to control the rudder in the manual control mode.

In accordance with one aspect of the present invention, a watercraft comprises a rudder unit, and comprises a steering position input device that provides a position command signal indicative of a position of the rudder unit. An azimuth sensing device or a location sensing device is provided. The azimuth sensing device senses an actual azimuth of the watercraft to provide an actual azimuth signal. The location sensing device senses an actual location of the watercraft to provide an actual location signal. A control device controls the position of the rudder unit. A control data input device selectively provides the control device with a first mode signal that starts a first mode of the control device and a second mode signal that starts a second mode of the control device. The second mode signal is accompanied by a target azimuth signal indicative of a target azimuth of the watercraft or a target location signal indicative of a target location of the watercraft. The control device controls the position of the rudder unit based upon the position command signal in the first mode. The control device controls the position of the rudder unit such that an actual azimuth amount designated by the actual azimuth signal generally coincides with a target azimuth amount designated by the target azimuth signal. The control device starts the first mode in place of the second mode without the first mode signal if the position command signal changes while the control device controls the position of the rudder unit in the second mode.

In accordance with another aspect of the present invention, a watercraft comprises a rudder unit. A steering position input device provides a position command signal indicative of a position of the rudder unit. An azimuth sensing device or a location sensing device is provided. The azimuth sensing device senses an actual azimuth of the watercraft to provide an actual azimuth signal. The location sensing device senses an actual location of the watercraft to provide an actual location signal. A control device controls the position of the rudder unit. A control data input device selectively provides the control device with a first mode signal that starts a first mode of the control device and a second mode signal that starts a second mode of the control device. The second mode signal is accompanied by a target azimuth signal indicative of a target azimuth of the watercraft or a target location signal indicative of a target location of the watercraft. The control device controls the position of the rudder unit based upon the position command signal in the first mode. The control device controls the position of the rudder unit such that an actual azimuth amount designated by the actual azimuth signal generally coincides with a target azimuth amount designated by the target azimuth signal. The control device controls the rudder unit based upon the position command signal if the position command signal changes while the control device controls the rudder unit in the second mode.

In accordance with a further aspect of the present invention, a steering control system is provided for a watercraft that has a rudder unit. The steering control system comprises a steering position input device to provide a position command signal indicative of a position of the rudder unit. An azimuth sensing device or a location sensing device is provided. The azimuth sensing device senses an actual azimuth of the watercraft to provide an actual azimuth signal. The location sensing device senses an actual location of the watercraft to provide an actual location signal. A control device controls the position of the rudder unit. A control data input device selectively provides the control device with a first mode signal that starts a first mode of the control device and a second mode signal that starts a second mode of the control device. The second mode signal is accompanied by a target azimuth signal indicative of a target azimuth of the watercraft or a target location signal indicative of a target location of the watercraft. The control device controls the position of the rudder unit based upon the position command signal in the first mode. The control device controls the position of the rudder unit such that an actual azimuth amount designated by the actual azimuth signal generally coincides with a target azimuth amount designated by the target azimuth signal in the second mode. The control device starts the first mode in place of the second mode without the first mode signal if the position command signal changes while the control device controls the position of the rudder unit in the second mode.

In accordance with a further aspect of the present invention, a control method is provided for controlling a position of a rudder of a watercraft. The control method comprises generating a position command signal indicative of a position of the rudder, either sensing an actual azimuth of the watercraft to generate an actual azimuth signal or sensing an actual location of the watercraft to generate an actual location signal, generating a first mode signal that starts a first mode, generating a second mode signal that starts a second mode, either generating a target azimuth signal indicative of a target azimuth of the watercraft or generating a target location signal indicative of a target location of the watercraft, controlling the position of the rudder based upon the position command signal in the first mode, controlling the position of the rudder such that an actual azimuth amount designated by the actual azimuth signal generally coincides with a target azimuth amount designated by the target azimuth signal, determining whether the position command signal changes while the control device controls the position of the rudder in the second mode, and starting the first mode in place of the second mode without the first mode signal if the determination is positive.

In accordance with a further aspect of the present invention, a control method is provided for controlling a position of a rudder of a watercraft. The control method comprises generating a position command signal indicative of a position of the rudder, either sensing an actual azimuth of the watercraft to generate an actual azimuth signal or sensing an actual location of the watercraft to generate an actual location signal, generating a first mode signal that starts a first mode, generating a second mode signal that starts a second mode, either generating a target azimuth signal indicative of a target azimuth of the watercraft or generating a target location signal indicative of a target location of the watercraft, controlling the position of the rudder based upon the position command signal in the first mode, controlling the position of the rudder such that an actual azimuth designated by the actual azimuth signal generally coincides with a target azimuth amount designated by the target azimuth signal, determining whether the position command signal changes while the control device controls the position of the rudder in the second mode, and controlling the rudder based upon the position signal if the determination is positive.

In accordance with a further aspect of the present invention, a steering control system is provided for a watercraft. The steering control system comprises an autopilot system that automatically steers the watercraft when the watercraft is in an autopilot mode. A mode control switch is operable by an operator to switch the watercraft into and out of the autopilot mode. A controller is responsive to operator movement of a steering device of the watercraft with the watercraft in the autopilot mode by taking the watercraft out of the autopilot mode to allow the operator to steer the watercraft manually, whereby the user can take the watercraft out of the autopilot mode without operating the mode control switch.

In accordance with a further aspect of the present invention, a computerimplemented method of operating a watercraft is provided. The method comprises steering the watercraft automatically in an autopilot control mode according to pre-specified data provided by an operator; and responding to rotational movement by the operator of a steering device of the watercraft by disabling the autopilot control mode to allow the operator to steer the watercraft manually.

BRIEF DESCRIPTION OF THE DRAWINGS

The foregoing and other features, aspects and advantages of the present invention are described in detail below with reference to the drawings of preferred embodiments which are intended to illustrate and not to limit the invention. The drawings comprise eleven figures in which.

DETAILED DESCRIPTION OF THE PREFERRED EMBODIMENTS OF THE INVENTION

With reference to FIGS. 1–6, a watercraft 30 configured in accordance with certain features, aspects and advantages of the present invention is described below. Although the watercraft 30 includes a communication network 32 in the illustrated embodiment, those skilled in the art will appreciate that the invention may be practiced without the use of a network. In addition, although the decision logic in the preferred embodiment is distributed across multiple nodes, a centralized (non-distributed) computing architecture may alternatively be used in which most of the functionality of the nodes is implemented within a program executed by a single computer processor.

Figure 1:
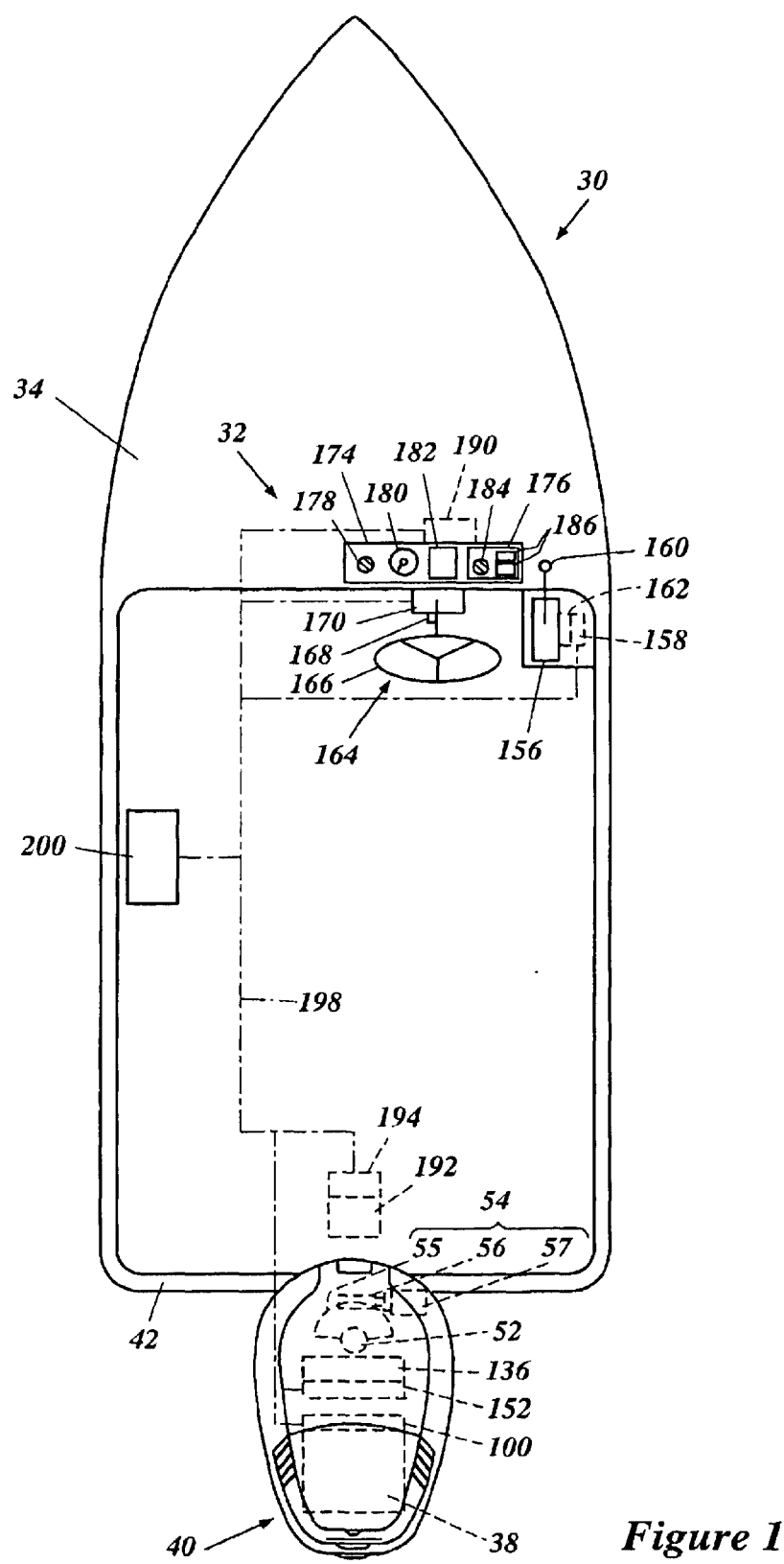
FIG. 1 illustrates a schematic representation of a top plan view of a watercraft configured in accordance with certain features, aspects and advantages of the present invention, including an outboard motor as part of the watercraft and as a rudder unit of the watercraft, wherein a control device of the outboard motor and a steering device are electrically connected with each other through a network.

With reference to FIG. 1, the watercraft 30 has a hull 34. The watercraft 30 also has a propulsion device 36 that propels the hull 34 and an internal combustion engine 38 that powers the propulsion device 36. In the illustrated embodiment, an outboard motor 40 mounted on a transom 42 of the hull 34 incorporates the propulsion device 36 and the engine 38. Other marine drives such as, for example, stern drives can replace the outboard motor 36.

Figure 2:
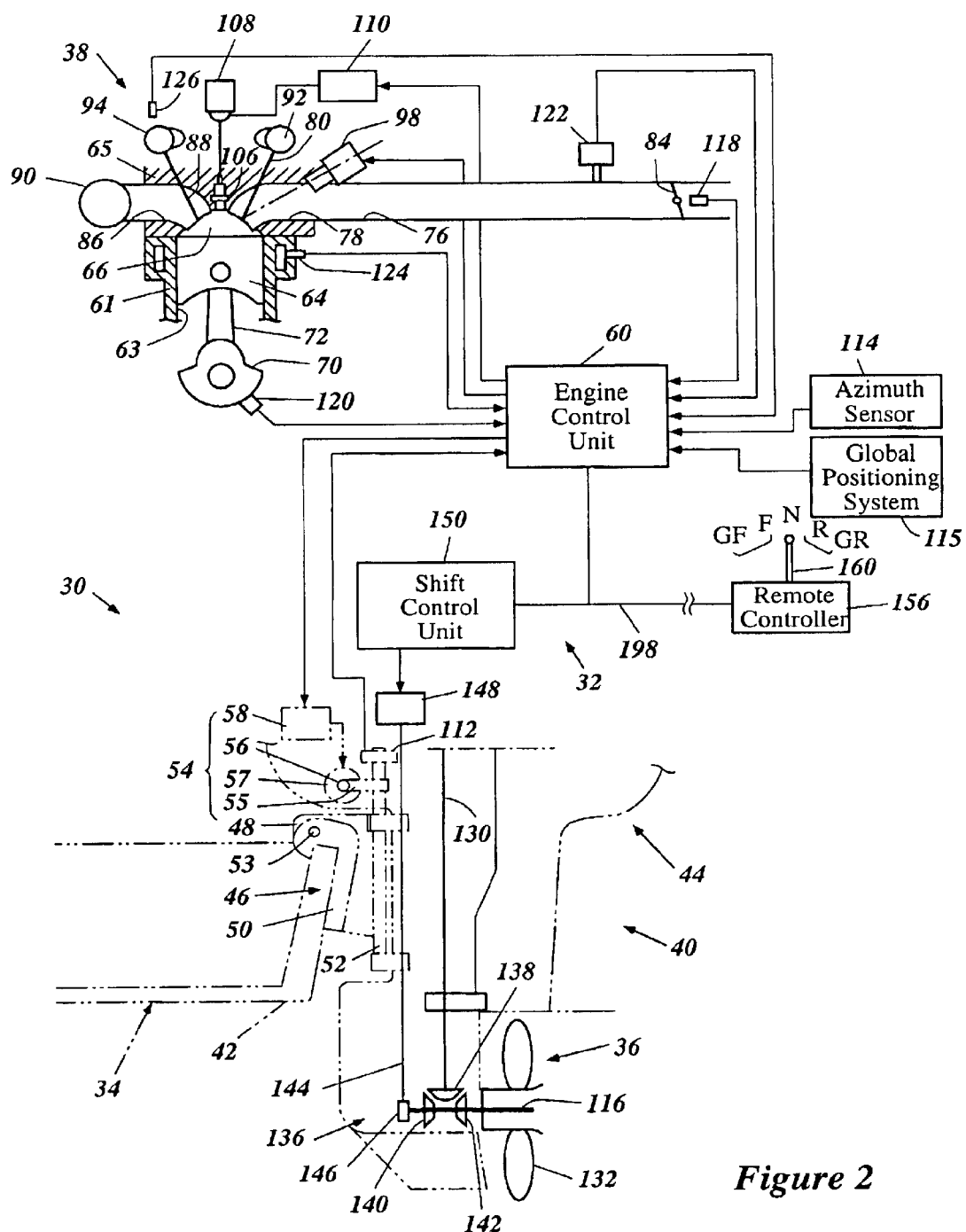
FIG. 2 illustrates a schematic representation of a side elevational view of the outboard motor of FIG. 1, showing the control device that controls an engine of the outboard motor and also a steering angle position of the outboard motor.

With reference to FIG. 2, the outboard motor 40 comprises a housing unit 44 and a bracket assembly 46. The bracket assembly 46 supports the housing unit 44 on a transom 42 of the hull 34 so as to place the propulsion device 36, which is disposed on a lower portion of the housing unit 44, in a submerged position with the watercraft 30 resting on the surface of a body of water. The bracket assembly 46 preferably comprises a swivel bracket 48, a clamping bracket 50, a steering shaft 52 and a pivot pin 53.

The steering shaft 52 preferably extends through the swivel bracket 48 and is affixed to the housing unit 44. The steering shaft 52 is pivotally journaled for steering movement about a generally vertically extending steering axis defined within the swivel bracket 48. Because the lower portion of the housing unit 44 normally is in the submerged position and the housing unit 44 together with the steering shaft 52 can pivot about the axis of the steering shaft 52, the housing unit 44 can act as a rudder.

The clamping bracket 50 comprises a pair of bracket arms that are spaced apart from each other and that are affixed to the watercraft transom 42. The pivot pin 53 completes a hinge coupling between the swivel bracket 48 and the clamping bracket 50. The pivot pin 53 extends through the bracket arms so that the clamping bracket 50 supports the swivel bracket 48 for pivotal movement about a generally horizontally extending tilt axis defined by the pivot pin 53. The housing unit 44 thus can be tilted or trimmed about the pivot pin 53.

With continued reference to FIG. 2 and together reference to FIG. 1, the outboard motor 40 preferably has a steering mechanism 54 that comprises a fan-like shaped worm wheel 55, a worm gear 56, a steering actuator 57 and a drive circuit 58. The worm wheel 55 is affixed onto the steering shaft 52. The worm gear 56 is affixed onto a shaft of the steering actuator 57 and meshes with the worm wheel 55. The steering actuator 52 preferably is a servomotor and is affixed onto the housing unit 44. The drive circuit 58 electrically drives the actuator 57 either in a right direction or in a reverse direction under control of an engine control unit 60.

With reference to FIG. 2, the engine control unit 60 calculates a steering angle position control amount èc in a manner that will be described below and provides the calculated steering position control amount èc to the drive circuit 58. The worm gear 56 on the shaft of the actuator 57 turns when the drive circuit 58 drives the actuator 57 to move the worm wheel 55. The steering shaft 52 coupled with the housing unit 44 pivots about the axis of the steering shaft 52. As thus constructed, the housing unit 44 as the rudder and the steering mechanism 54 including the steering actuator 57 together form a rudder unit in this arrangement.

In the illustrated arrangement, a rotation of the shaft of the actuator 57 in the right direction corresponds to a counterclockwise movement of the housing unit 44 about the axis of the steering shaft 52 in a top plan view (FIG. 1), and another rotation of the shaft of the actuator 57 in the reverse direction corresponds to a clockwise movement of the housing unit 44 about the axis of the steering shaft 52 in the same top plan view. An amount of each movement is consistent with an absolute value of the steering position angle control amount èc. In one variation, the outboard motor 40 can have a special control unit for the steering control other than the engine control unit 60.

As used through this description, the terms "forward," "forwardly" and "front" mean at or to the side where the bracket assembly 46 is located, and the terms "rear," "reverse," "backwardly" and "rearwardly" mean at or to the opposite side of the front side, unless indicated otherwise or otherwise readily apparent from the context of use.

The engine 38 is disposed atop the housing unit 44. The engine 38 preferably operates on a four-cycle combustion principle. The engine 38 comprises a cylinder block 61 that defines four cylinder bores 63. A piston 64 can reciprocate in each cylinder bore 63. A cylinder head assembly 64 is affixed to the cylinder block 61 to close one end of the cylinder bores 63. The cylinder head assembly 65, in combination with the cylinder bores 63 and the pistons 64, define four combustion chambers 66. The cylinder head assembly 65 is disposed on the rear side of the engine 38 relative to the bracket assembly 46.

The other end of the cylinder block 61 is closed with a crankcase member that at least partially defines a crankcase chamber. A crankshaft 70 extends generally vertically through the crankcase chamber. The crankshaft 70 is connected to the pistons 62 by connecting rods 72 and is rotated by the reciprocal movement of the pistons 62.

The engine 38 preferably is provided with an air intake system to introduce air to the combustion chambers 66. The air intake system preferably includes a plenum chamber, air intake passages 76 and intake ports 78 that are formed in the cylinder block 61. The air intake passages 76 and the intake ports 78 are associated with the respective combustion chambers 66. The intake ports 78 are defined in the cylinder head assembly 65 and are repeatedly opened and closed by intake valves 80. When the intake ports 78 are opened, the air intake passages 76 communicate with the associated combustion chambers 66.

The engine 38 is covered with a protective cowling that has an air intake opening. Ambient air is drawn into a cavity of the cowling around the engine 38 through the air intake opening. The air in the cavity is drawn into the respective air intake passages 76 through the plenum chamber. Because the intake passages 76 can communicate with the combustion chambers 66 when the intake valves 80 are opened, the air can enter the respective combustion chambers 66 at the open timing of the intake valves 80.

A throttle valve 84 preferably is disposed within each air intake passage 76 downstream of the plenum chamber to regulate an amount of air to each combustion chamber 66. The throttle valve 84 preferably is a butterfly type valve and moves generally between a fully closed position and a fully open position. The throttle valves 84 preferably have a common valve shaft journaled for pivotal movement. A certain amount of air is admitted to pass through the intake passage 76 in accordance with an angular position or open degree of the throttle valve 84 when the valve shaft pivots. The angular position is a throttle valve position of the throttle valves 84 in this embodiment.

A throttle valve actuator preferably is coupled with the valve shaft to actuate the throttle valves 84. A servomotor preferably forms the actuator. Normally, an air amount or rate of airflow increases when the open degree of the throttle valves 84 increases. Unless the environmental circumstances change, an engine speed of the engine 38 increases generally along with the increase of the air amount.

The engine 38 preferably is provided with an exhaust system to discharge burnt charges or exhaust gases to a location outside of the outboard motor 40 from the combustion chambers 66. Exhaust ports 86 are defined in the cylinder head assembly 65 and are repeatedly opened and closed by exhaust valves 88. An exhaust manifold 90 is connected to the exhaust ports 86 to collect the exhaust gases. The combustion chambers 66 communicate with the exhaust manifold 90 when the exhaust ports 86 are opened. The exhaust gases are discharged to a body of water that surrounds the outboard motor 40 through the exhaust manifold 90 and exhaust passages formed in the housing unit 44 when the engine 38 operates above idle. The exhaust gases also are directly discharged into the atmosphere through the exhaust manifold 90, an idle exhaust passage and an opening formed at the housing unit 44 when the engine 38 operates at idle.

An intake camshaft 92 and an exhaust camshaft 94 preferably are journaled for rotation and extend generally vertically in the cylinder head assembly 65. The intake camshaft 92 actuates the intake valves 80 while the exhaust camshaft 94 actuates the exhaust valves 88. The camshafts 92, 94 have cam lobes to push the respective valves 80, 88. Thus, the associated ports 78, 86 communicate with the combustion chambers 66 when the cam lobes push the valves 80, 88. Each camshaft 92, 94 and the crankshaft 70 preferably have a sprocket. A timing belt or chain is wound around the respective sprockets in this arrangement. Accordingly, the crankshaft 70 can drive the camshafts 92, 94 by the timing belt or chain.

The illustrated engine 38 preferably has a fuel injection system. The fuel injection system employs four fuel injectors 98 allotted for each combustion chamber 66. The fuel is reserved in a fuel tank and is pressurized by multiple fuel pumps, although FIG. 2 schematically illustrates only one fuel injector 98. Each fuel injector 98 is affixed to the cylinder head assembly 65 with a nozzle exposed into each intake port 78. The nozzle of each fuel injector 98 is directed to the associated combustion chamber 66.

The fuel injectors 98 preferably spray fuel into the intake ports 78 when the intake valves 80 are opened under control of the foregoing engine control unit 60. The sprayed fuel enters the combustion chambers 66 together with the air that passes through the intake passages 76. An amount of the sprayed fuel is determined by the engine control unit 60 in accordance with the amount of the air regulated by the throttle valves 84 to keep a proper air/fuel ratio. Typically, a fuel pressure is strictly managed by the fuel injection system. Thus, the engine control unit 60 determines a duration of the injection to determine the fuel amount. The engine control unit 60 eventually controls the duration and an injection timing of each injection. The engine control unit 60 in this arrangement generally forms a portion of an engine control node 100 of the network system 32, which will be described in greater detail below.

Other types of fuel supply systems are applicable. For example, a direct fuel injection system that sprays fuel directly into the combustion chambers or a carburetor system can be used.

The engine 38 preferably has an ignition or firing system. Each combustion chamber 66 is provided with a spark plug 106. The spark plug 106 is exposed into the associated combustion chamber 66 and ignites an air/fuel charge at a proper ignition timing. The ignition system preferably has ignition coils 108 and igniters 110 which are connected to the engine control unit 60 such that the ignition timing also is under control of the engine control unit 60.

The engine 38 and the exhaust system build much heat. Thus, the outboard motor 40 preferably has a cooling system for the engine 38 and the exhaust system. In the illustrated arrangement, the cooling system is an open-loop type water cooling system. Cooling water is introduced into the system from the body of water and is discharged there after traveling around water jackets in the engine 38 and water passages in the exhaust system. The water jackets preferably are formed in the cylinder block 61 and the cylinder head assembly 65.

As described above, the engine control unit 60 controls at least the steering actuator 57, the throttle valve actuator, the fuel injectors 98 and the igniters 110 in the illustrated embodiment. In order to control those components 76, 94, 102, the engine control unit 60 monitors the operation of the engine 38 using sensors.

A steering position sensor 112 preferably is provided on the steering shaft 52 to sense an actual angular position of the steering shaft 52. Rotary potentiometers or encoders such as, for example, an optical encoder or a magnetic encoder can form the steering position sensor 112. The steering position sensor 112 provides a position signal èd corresponding to the actual angular position of the steering shaft 52 to the engine control unit 60. The signal èd preferably indicates a position "0" when an axis of a propulsion shaft 116, which will be described below, is generally consistent with a longitudinal axis of the watercraft hull 34 that extends fore to aft relative to the hull 34. The signal èd also provides a positive amount corresponding to an angular position relative to the longitudinal axis of the hull 34 when the propulsion shaft 116 pivots counterclockwise about the axis of the steering shaft 52 in the top plan view (FIG. 1). Also, the signal èd provides a negative amount corresponding to an angular position relative to the longitudinal axis of the hull 34 when the propulsion shaft 116 pivots clockwise about the axis of the steering shaft 52 in the top plan view (FIG. 1).

An azimuth sensor 114 preferably is provided to sense an azimuth of the watercraft 30. The azimuth of the watercraft 30 generally represents a point of the compass or a direction for which the watercraft 30 proceeds. For example, a gyrocompass or the like can be used as the azimuth sensor 114. A sensed signal AZd is sent to the engine control unit 60 in this arrangement.

A location sensor 115 preferably is provided to sense a location of the watercraft 30. The location of the watercraft 30 may be represented as an intersection point of a line of geographical longitude and a line of geographical latitude where the watercraft 30 is located. For example, a Global Positioning System (GPS) can detect the location of the watercraft 30. An output Pd of the GPS, which indicates the location of the watercraft 30, is sent to the engine control unit 60 in this arrangement.

A throttle valve position sensor 118 preferably is disposed adjacent to at least one of the throttle valves 84 to sense an actual throttle valve position of the throttle valves 84. A sensed signal THd is sent to the engine control unit 60.

Associated with the crankshaft 70, a crankshaft angle position sensor 120 preferably is provided to sense a crankshaft angle position and to output a crankshaft angle position signal to the engine control unit 60. The engine control unit 60 can calculate an engine speed Ne using the crankshaft angle position signal versus time. In this regard, the crankshaft angle position sensor 120 and part of the engine control unit 60 together form an engine speed sensor. The crankshaft angle position sensor 120, or another sensor, can also be used to provide reference position data to the engine control unit 60 for timing purposes, such as for the timing of fuel injection and/or ignition timing.

An intake air pressure sensor 122 preferably senses an intake pressure at least in one of the intake passages 76. The sensed signal is sent to the engine control unit 60. This signal, as well as the throttle valve position signal THd, represents an engine load. Additionally or alternatively, an air flow sensor can be disposed in at least one of the intake passages 76 to also sense the engine load.

Other sensors can be added. For example, in one arrangement, an engine temperature sensor 124 senses a temperature of the cylinder block 61 and the sensed signal is sent to the engine control unit 60. In one variation, a water temperature sensor placed at one of the water jackets of the cooling system can replace the engine temperature sensor because the water temperature varies generally in accordance with the engine temperature. A cylinder discrimination sensor 126 senses an angle position of the exhaust camshaft 94 and the sensed signal is sent to the engine control unit 60.

The sensed signals can be transferred through hard-wired connections, emitter and detector pairs, infrared radiation, radio waves or the like. The type of signal and the type of connection can be varied from one sensor to another, or the same type can be used with all sensors.

With continued reference to FIG. 2, the housing unit 44 journals a driveshaft 130 for rotation. The driveshaft 130 extends generally vertically through the housing unit 44. The crankshaft 70 drives the driveshaft 130. The housing unit 44 also journals the propulsion shaft 116 for rotation. The propulsion shaft 116 extends generally horizontally through the lower portion of the housing unit 44. The driveshaft 130 and the propulsion shaft 116 are preferably oriented normal to each other (e.g., the rotation axis of propulsion shaft 116 is at 90° to the rotation axis of the driveshaft 130). The propulsion shaft 116 drives the propulsion device 36. In the illustrated arrangement, the propulsion device 36 is a propeller 132 that is affixed to an outer end of the propulsion shaft 116. The propulsion device 36, however, can take the form of a dual, a counter-rotating system, a hydrodynamic jet, or any of a number of other suitable propulsion devices.

A changeover mechanism or transmission 136 preferably is provided between the driveshaft 130 and the propulsion shaft 116. The changeover mechanism 136 in this arrangement comprises a drive pinion 138, a forward bevel gear 140 and a reverse bevel gear 142 to couple the two shafts 116, 130. The drive pinion 138 is disposed at the bottom of the driveshaft 130. The forward and reverse bevel gears 140, 142 are disposed on the propulsion shaft 116 and spaced apart from each other. Both bevel gears 140, 142 always mesh with the drive pinion 138. The bevel gears 140, 142, however, race on the propulsion shaft 116 unless fixedly coupled with the propulsion shaft 116.

A dog clutch unit (not shown), which also is a member of the changeover mechanism 136, is slideably but not rotatably disposed between the bevel gears 140, 142 on the propulsion shaft 116 so as to selectively engage the forward bevel gear 140 or the reverse bevel gear 142 or not engage any one of the forward and reverse bevel gears 140, 142. The forward bevel gear 140 or the reverse bevel gear 142 can be fixedly coupled with the propulsion shaft 116 when the dog clutch unit engages the forward bevel gear 140 or the reverse bevel gear 142, respectively.

The changeover mechanism 136 further has a shift rod 144 that preferably extends vertically through the steering shaft 52, although FIG. 2 schematically illustrates the shift rod out of the steering shaft 52. The shift rod 144 can pivot about an axis of the shift rod 144. The shift rod 144 has a shift cam 146 at the bottom. The shift cam 146 abuts a front end of the dog clutch unit. The dog clutch unit thus follows the pivotal movement of the shift cam 146 and slides on the propulsion shaft 116 to engage either the forward or reverse bevel gear 140, 142 or not engage any one of the bevel gears 140, 142.

Engagement states of the forward and reverse bevel gear 140, 122 with the dog clutch unit correspond to operational modes of the propeller 132. The operational modes of the propeller 132 include a forward mode F, a reverse mode R and a neutral mode N. The first engagement state in which the dog clutch unit engages the forward bevel gear 140 corresponds to the forward mode F. The second engagement state in which the dog clutch unit engages the reverse bevel gear 142 corresponds to the reverse mode R. The third engagement state in which the dog clutch unit does not engage the forward bevel gear 140 or the reverse bevel gear 142 corresponds to the neutral mode N. In the forward mode F, the propeller 132 rotates in a right rotational direction that propels the watercraft 30 forwardly. In the reverse mode R, the propeller 132 rotates in a reverse rotational direction that propels the watercraft 30 backwardly. In the neutral mode N, the propeller 132 does not rotate and does not propel the watercraft 30. In this description, the operational mode of the propeller 132 may be called a "shift mode." Also, the engagement state of the dog clutch unit may be called a "shift position."

In the illustrated embodiment, a shift rod actuator 148, which preferably is a servo motor, is coupled with the top end of the shift rod 144 to pivot the shift rod 144. The shift rod actuator 148 is under control of a shift control unit 150. The shift control unit 150 in this arrangement generally forms a portion of a shift control node 152 (FIG. 1) of the network system 32. The shift control unit 150 commands the shift rod actuator 148 to actuate the shift rod 144. The shift cam 146 thus brings the dog clutch unit into the first, second or third engagement state (i.e., forward shift position F, reverse shift position R or neutral shift position N).

As described above, the shift control unit 150 controls at least the shift rod actuator 148 in the illustrated embodiment. In order to control the shift rod actuator 148, the shift control unit 150 monitors at least an actual angular position of the shift rod 144. The outboard motor 40 thus has a shift rod angle position sensor (not shown) adjacent to the shift rod 144. Rotary potentiometers or encoders such as, for example, an optical encoder or a magnetic encoder can form the shift rod angle position sensor. The sensed signal is sent to the shift control unit 150.

With reference to FIGS. 1 and 2, the operator can input a certain throttle valve position command THr to the engine control unit 60 and a shift position command Sr to the shift control unit 150 through an operating device. The operating device in this embodiment is a remote controller 156 that preferably is disposed on the right-hand side of a cockpit of the watercraft 30. The remote controller 156 forms a portion of a remote controller node 158 of the network system 32.

The remote controller 156 preferably has a control lever 160 that is journaled on a housing of the remote controller 156 for pivotal movement. The control lever 160 is operable by the operator so as to pivot between two limit ends. A reverse acceleration range GR, a reverse troll position R, a neutral position N, a forward troll position F and a forward acceleration range GF can be selected in this order between the limit ends. That is, one limit end corresponds to a most accelerated position of the reverse acceleration range GR and the other limit end corresponds to a most accelerated position of the forward acceleration range GF. The reverse troll position R is consistent with a least accelerated position of the reverse acceleration range GR, while the forward troll position F is consistent with a least accelerated position of the forward acceleration range GF. Preferably, the control lever 160 stays at any position between the limit ends unless the operator operates the lever 160.

A control lever angle position sensor 162 is disposed adjacent to the control lever 160 to sense an angle position of the control lever 160. The sensed signal is transferred to the engine control unit 60 and the shift control unit 150 through the network system 32. Rotary potentiometers or encoders such as, for example, an optical encoder or a magnetic encoder can form the control lever angle position sensor 162.

The remote controller 156 preferably provides the engine control unit 60 and the shift control unit 150 with the throttle valve position command THr and a shift position command Sr, respectively, in accordance with an angle position or rotational angle degree of the control lever 160 through the network system 32.

More specifically, the position of the control lever 160 within the reverse acceleration range GR designates the reverse shift position (reverse mode) R and a throttle valve position between the fully closed position and the fully open position. In this state, the propeller 132 rotates in the reverse direction and at an accelerated speed corresponding to the engine speed.

The position of the control lever 160 at the reverse position R designates the reverse shift position (reverse mode) R and a throttle valve position at the fully closed position. In this state, the propeller 132 rotates in the reverse direction and in a troll speed. The troll speed preferably is a speed corresponding to the idle engine speed. The reverse troll position R substantially is equal to the least accelerated position of the reverse acceleration range GR. Additionally, the reverse troll position R preferably provides a reference level of an actual shift position Sd.

The position of the control lever 160 at the forward position F designates the forward shift position (forward mode) F and a throttle valve position at the fully closed position. In this state, the propeller 132 rotates in the forward direction and in the troll speed The position of the control lever 160 within the forward acceleration range GF designates the forward shift position (forward mode) F and a throttle valve position between the fully closed position and the fully open position. In this state, the propeller 132 rotates in the forward direction and at an accelerated speed corresponding to the engine speed. The forward troll position F substantially is equal to the least accelerated position of the forward acceleration range GF.

In one alternative, the remote controller 156 can have two control levers which provide the throttle valve position command THr and the shift position command Sr to the engine control unit 60 and the shift control unit 150, respectively. In another alternative, stick or sticks which are slideably disposed can replace the control lever or levers, respectively.

With reference back to FIG. 1, a steering device 164 preferably is placed at a center of the cockpit. The steering device 164 is a steering position input device and, in this embodiment, incorporates a steering wheel 166 mounted on the hull 34 for pivotal movement. The operator can rotate the steering wheel 166.

A steering position command sensor 168 preferably is disposed around a shaft of the steering wheel 166 or at any other portions in connection with the steering wheel 166. Rotary potentiometers or encoders such as, for example, an optical encoder or a magnetic encoder can form the steering position command sensor 168. The steering position command sensor 168 senses an angle position of the steering wheel 166 relative to the hull 34 to generate a steering position command signal èr. The steering position command signal èr can indicate "0" when the steering wheel 166 is placed at a neutral position. Also, the steering position command signal èr can indicate a positive amount when the operator turns the steering wheel 166 clockwise and can indicate a negative amount when the operator turns the steering wheel 166 counter-clockwise in the illustrated arrangement.

The steering device 164 preferably has a steering control node 170 of the network system 32, which will be described in greater detail below. Preferably, the remote controller 156 and the steering device 164 are disposed next to each other such that the operator can operate them simultaneously.

With continued reference to FIG. 1, a control and display panel unit 174 preferably extends in front of the steering device 164 on the hull 34. The illustrated control and display panel unit 174 preferably includes at least a control panel 176, a switch key recess 178, an azimuth meter 180, a display 182 and any other devices that are convenient for the operator. The control and display panel unit 174, and particularly the control panel 176, forms a control data input device in this embodiment. The control panel 176 preferably incorporates a mode selector 184 and an autopilot target amount input unit or data input unit 186.

The mode selector 184 is preferably a two-position switch by which the operator can select one of an autopilot or automatic control mode and a manual control mode. One physical position of the switch can generate an autopilot control mode signal that starts the autopilot control mode. The other physical position can generate a manual control mode signal that starts the manual control mode. When the autopilot control mode is selected, the watercraft 30 can proceed toward a target azimuth AZt or a target location Pt without manual operation by the operator. When the manual control mode is selected, the outboard motor 40 of the watercraft 30 is manually operable by the operator. Depending upon the type of switch used, the mode selector may be operated by physical movement, depression of a button, depression of a key on an LCD display, depression of a foot pedal, or any other appropriate action by the operator.

In one variation, the mode selector 184 can have an appearance as an autopilot control selection switch that has a closed or "ON" position and an open or "OFF" position. The autopilot control mode is selected when the switch is in the closed or "ON" position. Also, the manual control mode is selected when the switch is in the open or "OFF" position.

In another variation, a one-position switch can replace the two-position switch. For example, the one-position switch preferably is a normally open push switch that has a switch circuit. A bias member urges a movable contact to an open position and the movable contact can contact a fixed contact when the operator pushes the movable contact against the bias force of the bias member. The switch circuit initially is reset to the manual control mode when a main switch or power switch is closed and generates a trigger signal that starts the autopilot control mode when the operator pushes the movable contact. Afterwards, the switch circuit alternately changes the autopilot control mode to the manual control mode and vice versa whenever the operator pushes the movable contact.

As thus described, the mode selector 184 can take on any of a variety of appearances, configurations or mechanisms. In one embodiment, absence of the autopilot control mode signal preferably means that a manual control mode signal exists because the autopilot control mode and the manual control mode are selectively provided by the mode selector 184.

In order to provide the target azimuth AZt or the target location Pt of the watercraft 30, the operator can use the autopilot target amount input unit 186. Preferably, the target amount input unit 186 comprises a keyboard or any other input device through which the operator can selectively input numbers corresponding to azimuth amounts and numbers corresponding to a desired direction or course. Each azimuth amount preferably is an angle relative to a present direction of the watercraft 30. The numbers corresponding to azimuth amounts can be data for generating target azimuth signals AZt and the numbers corresponding to longitudes and latitudes can be data for generating target location signals Pt.

The switch key recess 178 preferably receives a switch key to operate a main switch unit that activates electrical components including the network system 32. The main switch unit preferably is formed with at least one main relay and other components including other relays. The electrical components are connected to an electric source such as, for example, one or more batteries when the operator inserts the switch key into the switch key recess 178 and rotates the switch key to turn the main switch unit on.

The azimuth meter 180 preferably is an analog meter that can indicate an actual azimuth AZd sensed by the azimuth sensor 114. Alternatively, an azimuth display such as, for example, a LCD (liquid crystal display) can replace the azimuth meter to indicate azimuth data either in analog or digital representation.

The display 182 preferably is a LCD and at least indicates a present location Pd of the watercraft 30 using, for example, a nautical chart. The location sensor or GPS 115 can indicate the present location Pd as an output signal thereof. The display 82 also can indicate the engine speed Ne of the engine 38, the shift position, the watercraft velocity and other necessary or useful information for operating the outboard motor 40 or any other devices on the watercraft 30. In one variation, a speedometer (watercraft velocity meter) can be separately equipped.

The control and display panel unit 174 has a panel unit node 190 of the network 32.

A watercraft velocity sensor 192 preferably is mounted on an outer bottom of the hull 34 in the stem of the watercraft 30. The velocity sensor 192 preferably comprises an impeller type sensor to sense a rotational speed of the impeller that is rotated by the water that flows along the bottom of the hull 34. The rotational speed of the impeller generally is proportion to the velocity of the watercraft 30 relative to the surface of the water. Alternatively, the velocity sensor 192 can incorporate a Pitot tube and senses a water pressure in the tube to detect the velocity of the watercraft 30. The velocity sensor 192 has a velocity sensor node 194 of the network system 32.

The network system 32 in the illustrated embodiment is a controller area network (CAN) that is one type of a local area network (LAN). A bus or bus line 198 of the network system 32 connects the engine control node 100, the shift control node 152, the remote controller node 158, the steering control node 170, the panel unit node 190 and the velocity sensor node 194, all of which are terminal nodes of the network system 32. A network management node 200 also is connected to the bus 198 to manage the terminal nodes 100, 152, 158, 170, 190, 194.

The illustrated bus 198 preferably is formed with twisted pair cables. Each terminal node 100, 152, 158, 170, 190, 194 has a classification identifier or ID that specifies its type. Each terminal node 100, 152, 158, 170, 190, 194 creates a transfer frame or packet that has an ID field in which at least the classification identifier can be included, and has a data field in which a product or parts number, a manufacturing number, a manufacturer number and other specific data can be included. Each terminal node 100, 152, 158, 170, 190, 194 transfers its frames onto the bus 198 according to certain timing to communicate with other terminal nodes and/or the management node 200. The management node 200 manages communication among these terminal nodes 100, 152, 158, 170, 190, 194. For communication purposes, the management node 200 assigns a physical address or network address to each terminal node 100, 152, 158, 170, 190, 194. A medium access method such as, for example, a carrier sense multiple access/collision detection (CSMA/CD) method preferably is used to access the bus 198.

The bus 198 can be connected to the nodes 100, 152, 158, 170, 190, 194, 200 in any form such as, for example, a ring form and a star form. The bus 198 can use any cables or wires other than the twisted pair cables such as, for example, Ethernet (CAT-5) or optical cables. Furthermore, a wireless type bus that has no cables or wires can replace the illustrated bus 198.

Such a network system is disclosed in, for example, a co-pending U.S. application Ser. No. 10/619,095 filed Jul. 11, 2003, titled MULTIPLE NODE NETWORK AND COMMUNICATION METHOD WITHIN THE NETWORK, the entire contents of which are hereby expressly incorporated by reference.

Because of the structure of the network 32, the engine control unit 60 and the shift control unit 150 can monitor and use all of the data that is transmitted on the network system 32 including the watercraft velocity data. For instance, the engine control unit 60 can monitor to the shift rod angle position (or shift position) that is primarily sent to the shift control unit 150. On the other hand, the shift control unit 150 can monitor to the throttle valve position THd that is primarily sent to the engine control unit 60. More generally, any node can monitor the transmissions of any other node.

Figure 3:
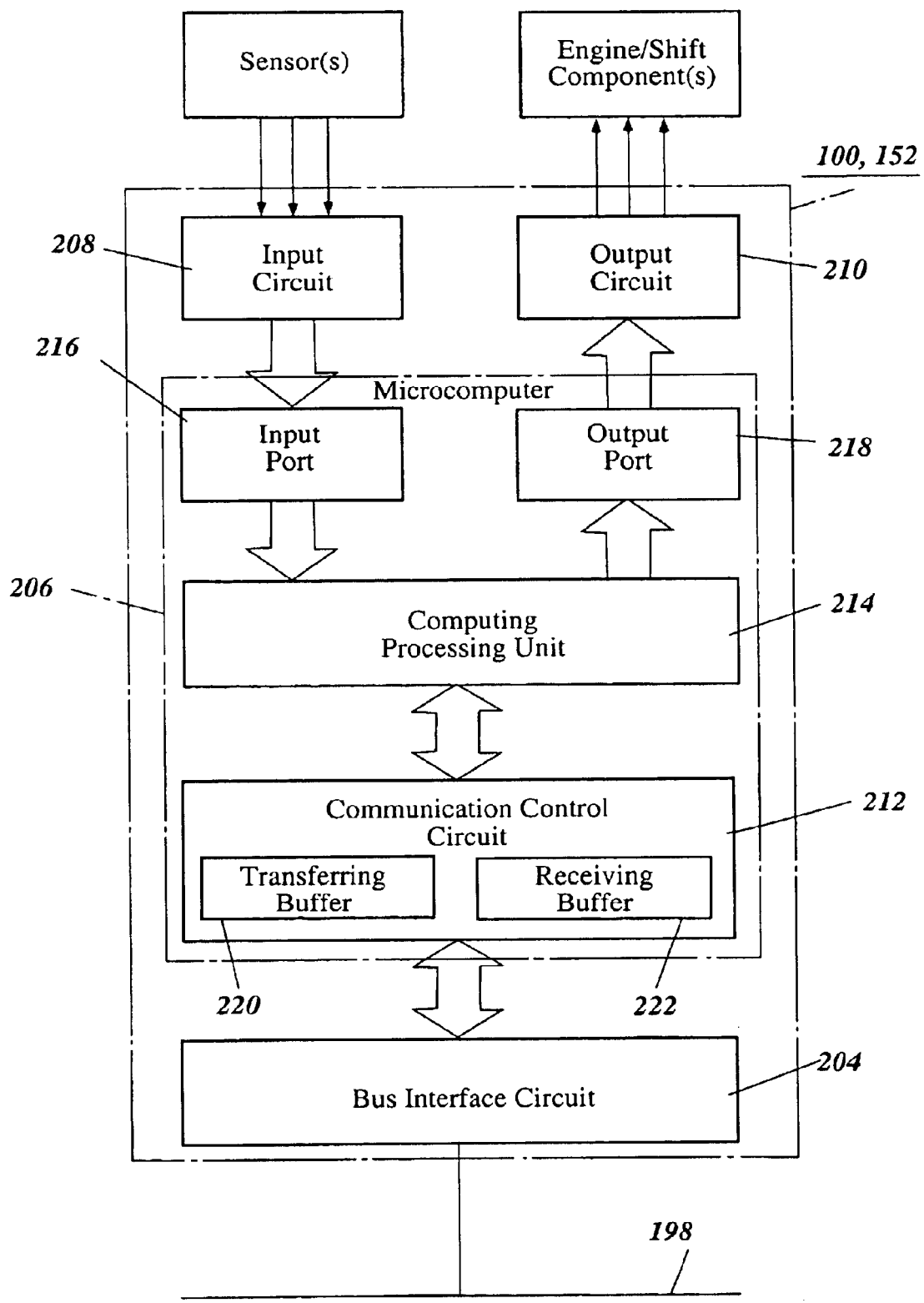
FIG. 3 illustrates a block diagram of a control node that may be either an engine control node associated with the engine and including the control device or a shift control node associated with a transmission of the outboard motor, wherein the engine control node and the shift control node are part of the network of FIG. 1.

With reference to FIG. 3, the engine control node 100 and the shift control node 152 have the same structure, and thus are represented by a common block diagram. Each comprises a bus interface circuit 204, a microcomputer 206, an input circuit 208 and an output circuit 210. The microcomputer 206 is a central processor of the engine control node 100 or the shift control node 152 and includes a communication control circuit 212, a computing processing unit 214, an input port 216 and an output port 218.

The microcomputer 206 of the engine control node 100 is preferably connected to at least the steering position sensor 112, the azimuth sensor 114, the location sensor (i.e., GPS) 115, the throttle valve position sensor 118, the crankshaft angle position sensor 120, the intake pressure sensor 122, the engine temperature sensor 124 and the cylinder discrimination sensor 126 through the input circuit 208. The microcomputer 206 of the shift control node 152 is preferably connected to at least the shift rod angle position sensor through the input circuit 208. The input circuit 208 of the engine control node 100 receives sensed signals or data from those sensors 112, 114, 115, 118, 120, 122, 124, 126 and sends the data to the input port 216. The input circuit 208 of the shift control node 152 receives sensed signals or data from the sensor shift rod angle position sensor and sends the data to the input port 216.

The input port 216 of the engine control node 100 receives the actual steering position data èd, the azimuth data AZd, the location data Pd, the actual throttle valve position data, the crankshaft angle position data and other sensed data from the input circuit 178 and passes those data to the engine control node's computing processing unit 214. The input port 216 of the shift control node 152 receives the actual shift rod angle position data and passes the data to the shift control node's computing processing unit 214.

The microcomputer 206 of the engine control node 100 is connected to the drive circuit 58 of the steering actuator 57, the throttle valve actuator, the fuel injectors 98 and the igniters 110 through the output circuit 210. The microcomputer 206 of the shift control node 152 is connected to the shift rod actuator 148 through the output circuit 210. The output port 218 receives control data from the computing processing unit 214 and passes the data to the output circuit 210. The output circuit 210 then transfers the control data to the actuators.

The computing processing unit 214 communicates with the communication control circuit 212 that has a transferring buffer 220 and a receiving buffer 222. The communication control circuit 212 is connected to the bus 198 through the bus interface circuit 204.

The computing processing unit 214 includes at least one non-volatile storage component or memory such as, for example, a ROM or EPROM device. The non-volatile storage preferably stores the classification identifier or ID, the product or part number, the manufacturing number, the manufacturer number and the specific data, as well as executable code. The computing processing unit 214 also includes one or more volatile storage components such as, for example, RAM to store a network address that will be assigned from the management node 200.

The computing processing unit 214 of the engine control node 100 calculates the engine speed Ne based upon the signal from the crankshaft angle position sensor 120. The computing processing unit 214 of the engine control node 100 also calculates the steering position control amount èc. The computing processing unit 214 of the engine control node 100 can calculate the target azimuth AZt based upon the current and target longitude and the latitude if the target azimuth AZt is not directly given. The computing processing unit 214 of the engine control node 100 further calculates a throttle valve position control amount THc, the injection timing and duration of the fuel injectors 98, and the ignition timing of the igniters 110 based upon the following: the engine speed Ne, the throttle valve position THd from the throttle valve position sensor 118, the throttle valve position command THr from the remote controller node 158, the shift position command Sr from the remote controller node 158 and a shift position domain Sa from the shift control node 152. The engine control node 100 controls the drive circuit 58 of the steering actuator 57, the throttle valve actuator, the fuel injectors 98 and the igniters 110 in accordance with the calculated results.

In addition, the computing processing unit 214 of the engine control node 100 creates transfer frames one by one, each including the classification identifier in the ID field and the steering position control amount èc in the data field for the steering control. The computing processing unit 214 of the engine control node 100 also creates transfer frames one by one, each including the classification identifier in the ID field and the throttle valve position THd and the engine speed Ne in the data field for the engine and shift controls.

The computing processing unit 214 of the shift control node 152 controls the shift rod actuator 148 based upon the shift position and a shift position domain; the engine speed Ne and the throttle valve position THd from the engine control node 100; and the throttle valve position command THr and the shift position command Sr from the remote controller node 158. The shift position domain is determined based upon the shift position sensed by the shift rod angle position sensor.

In addition, the computing processing unit 214 of the shift control node 152 preferably creates transfer frames one by one, each including the classification identifier in the ID field and the shift position domain in the data field for the engine and shift controls.

The engine control node 100 and the shift control node 152 output the transfer frames to the bus 198 through their respective communication control circuits 212 and bus interface circuits 204.

The engine control unit 60 is preferably substantially identical in structure to the engine control node 100 except for the bus interface circuit 204. Also, the shift control unit 150 is substantially identical in structure to the shift control node 152 except for the bus interface circuit 204.

Figure 4:
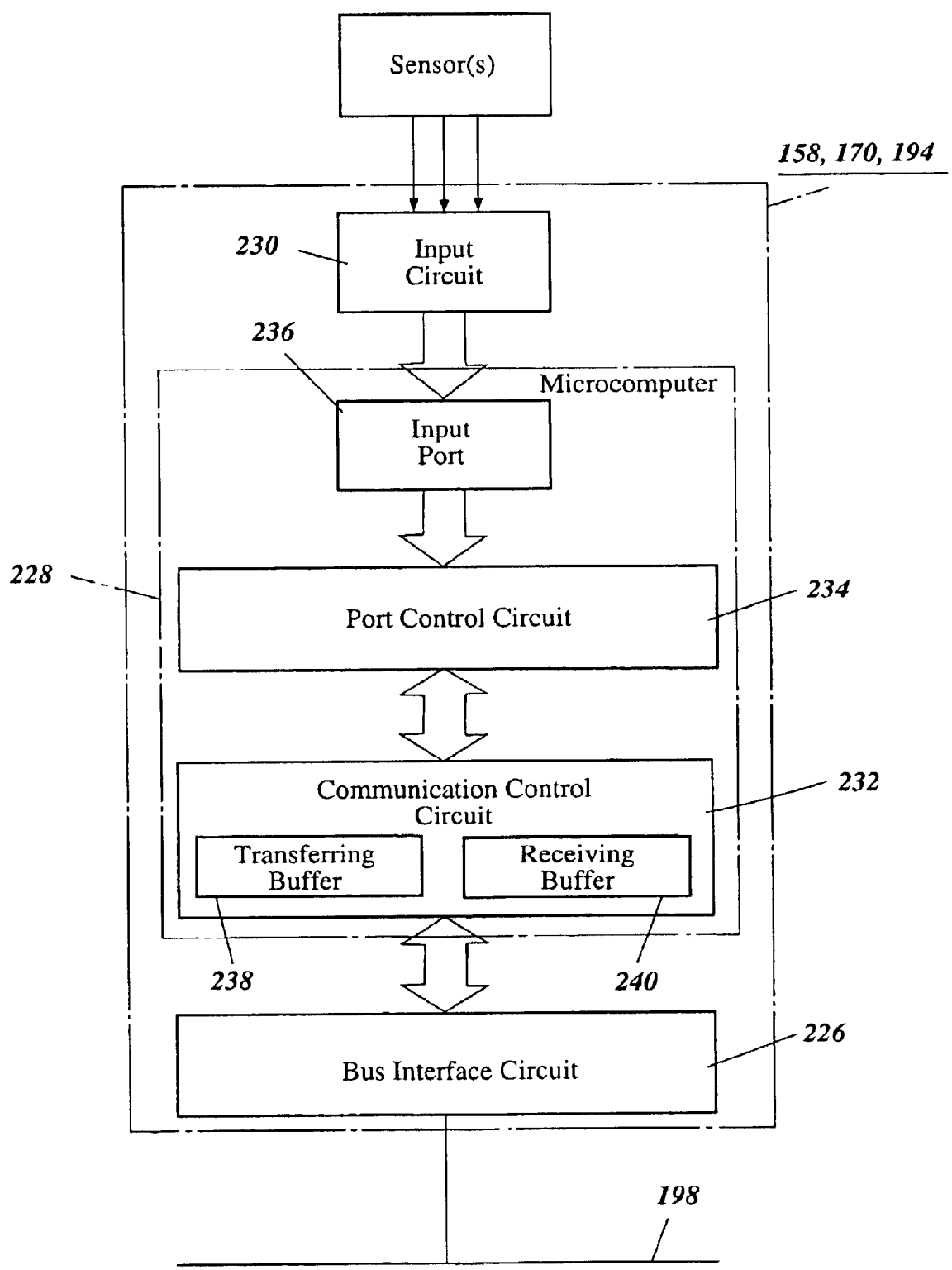
FIG. 4 illustrates a block diagram of a node that may be either a velocity sensor node, a remote controller node or a steering control node, all of which may be part of the network of FIG. 1.

With reference to FIG. 4, the remote controller node 158, the steering control node 170 and the velocity sensor node 194 each comprise a bus interface 226, a microcomputer 228 and an input circuit 230. The microcomputer 228 is a central processor of those nodes 158, 170, 194 and includes a communication control circuit 232, a port control circuit 234 and an input port 236.

The microcomputer 228 of the remote controller node 158 is connected to the control lever angle position sensor and receives the angle position of the control lever 160 through the input circuit 230. The microcomputer 228 of the steering control node 170 is connected to the steering position command sensor 168 and receives the steering position command signal èr from the steering position command sensor 168 through the input circuit 230. The microcomputer 228 of the velocity sensor node 194 is connected to the velocity sensor 192 and receives the watercraft velocity signal from the velocity sensor 192 through the input circuit 230. The received data are sent to the input port 236, which passes the data over to the port control circuit 234. The port control unit 234 communicates with the communication control circuit 232 that has a transferring buffer 238 and a receiving buffer 240. The communication control circuit 232 is connected to the bus 198 through the bus interface circuit 226.

The port control circuit 234 incorporates at least one non-volatile storage or memory component such as, for example, a ROM or EPROM device. The non-volatile storage preferably stores at least executable code, a classification identifier or ID allotted to the remote controller node 158, the steering control node 170 or the velocity sensor node 194. The port control circuit 234 of the remote controller node 158 creates transfer frames one by one, each including at least the classification identifier in the ID field and the throttle valve position command THr and the shift position command Sr in the data field. The port control circuit 234 of the steering control node 170 creates transfer frames one by one, each including at least the classification identifier in the ID field and the steering position command data èr in the data field. The port control circuit 234 of the velocity sensor node 194 creates transferring frames one by one, each including at least the classification identifier in the ID field and the watercraft velocity data in the data field.

The port control circuit 234 also incorporates one or more elements of volatile storage such as, for example, RAM to store the network address that will be assigned from the management node 200.

Figure 5:
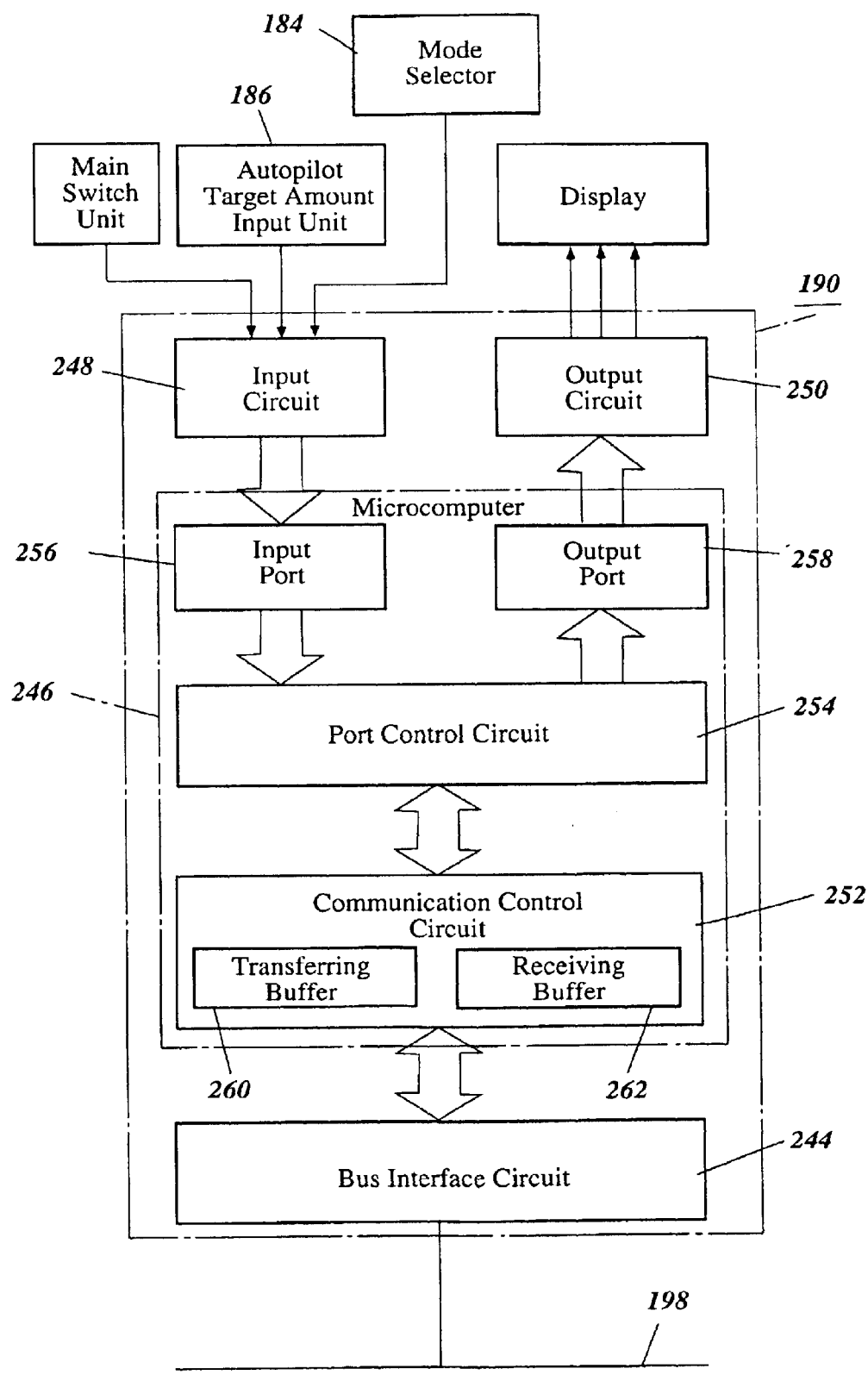
FIG. 5 illustrates a block diagram of a panel unit node which also is part of the network of FIG. 1.

With reference to FIG. 5, the panel unit node 190 comprises a bus interface circuit 244, a microcomputer 246, an input circuit 248 and an output circuit 250. The microcomputer 246 is a central processor of the panel unit node 190 and includes a communication control circuit 252, a port control circuit 254, an input port 256 and an output port 258.

The microcomputer 246 is connected through the input circuit 248 to at least the main switch unit that has the switch key recess 178, the mode selector 184 and the autopilot target amount input unit 186. The microcomputer 246 can be connected to other devices that have data that can be displayed on the display 182. For instance, the devices can include a compass or a residual fuel amount sensor, if any. The watercraft velocity sensor 192, for example, can be excluded because the watercraft velocity data is transferred to the panel unit node 190 through the bus 198. The input circuit 248 receives the main switch signal and the display data and sends the signal and data to the input port 256. The input port 256 receives the signal and data from the input circuit 248 and passes them to the port control circuit 254.

The microcomputer 246 also is connected to the azimuth meter 180 and the display 182 and other meters or panels, if any, through the output circuit 250. The output port 258 receives the display data from the port control circuit 254 and passes the data over to the output circuit 250. The output circuit 250 transfers the display data to azimuth meter 180, the display 182 and other meters or panels.

The port control circuit 254 communicates with the communication control circuit 252. The communication control circuit 252 has a transferring buffer 260 and a receiving buffer 262 and is connected to the bus 198 through the bus interface circuit 244.

The port control circuit 254 incorporates at least one non-volatile storage or memory component such as, for example, a ROM or EPROM device. The non-volatile storage preferably stores at least a classification identifier or ID allotted to the panel unit node 190. The port control circuit 254 creates at least one transfer frame including at least the classification identifier in the ID field. The port control circuit 254 also incorporates one or more volatile storage components such as, for example, RAM to store a network address that will be assigned from the management node 200.

Figure 6:
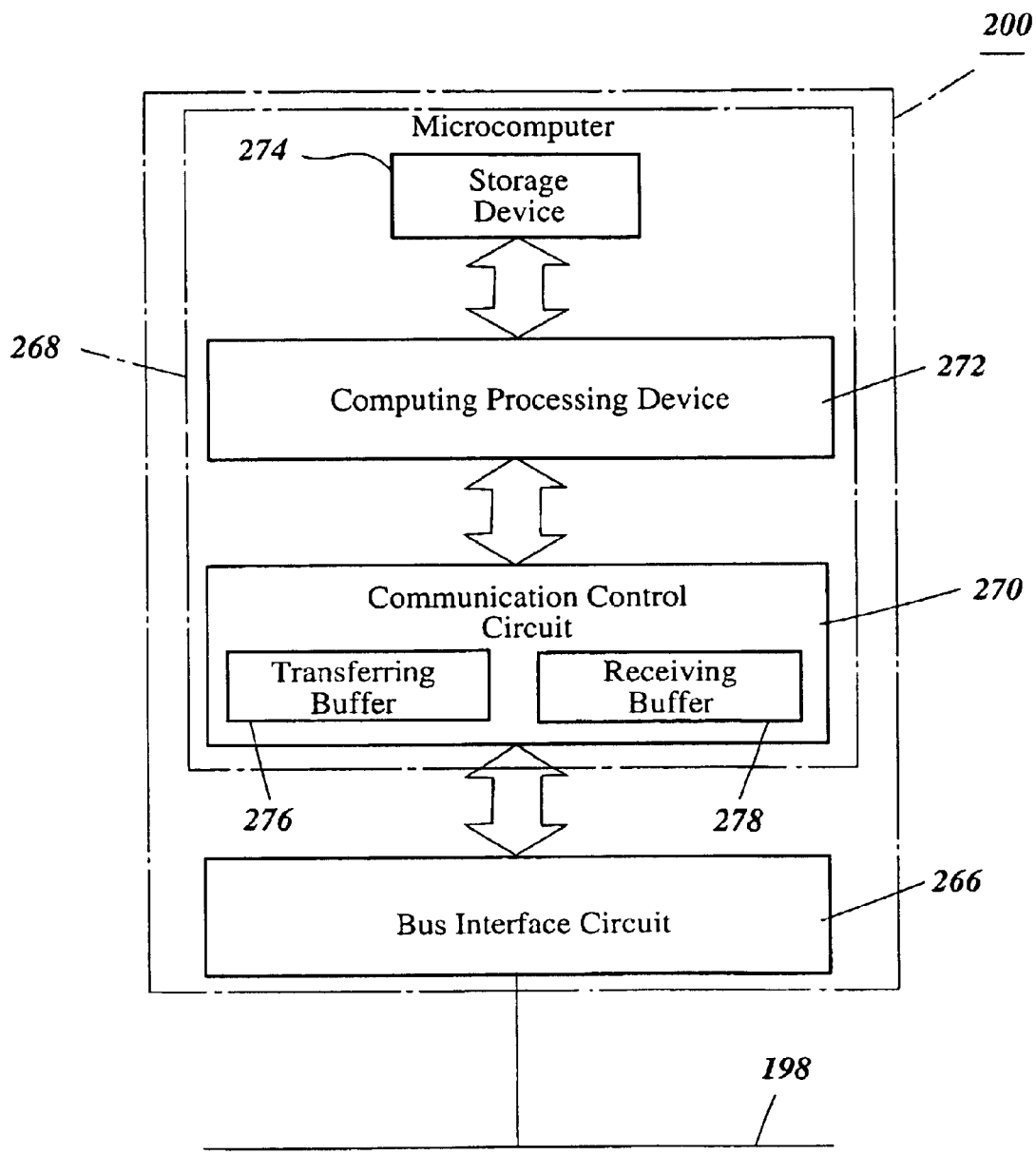
FIG. 6 illustrates a block diagram of a network management node which further is part of the network of FIG. 1.

With reference to FIG. 6, the network management node 200 comprises a bus interface circuit 266 and a microcomputer 268. The microcomputer 268 is a central processor of the management node 200 and includes a communication control circuit 270, a computing processing device 272 and a storage device 274.

The computing processing device 272 communicates with the communication control circuit 270. The communication control circuit 270 has a transferring buffer 276 and a receiving buffer 278 and is connected to the bus 198 through the bus interface circuit 266.

The computing processing device 272 also communicates with the storage device 274. The storage device 274 has at least one volatile storage component or memory such as, for example, RAM. The storage device 274 can also have non-volatile storage. The storage device 274 preferably stores a classification list indicating relationships between classifications and the classification identifiers, and a network address list indicating relationships between network addresses assigned to the respective terminal nodes 100, 152, 158, 170, 190, 194, and the classification identifiers and the manufacturing numbers of those terminal nodes 100, 152, 158, 170, 190, 194.

Figure 7:
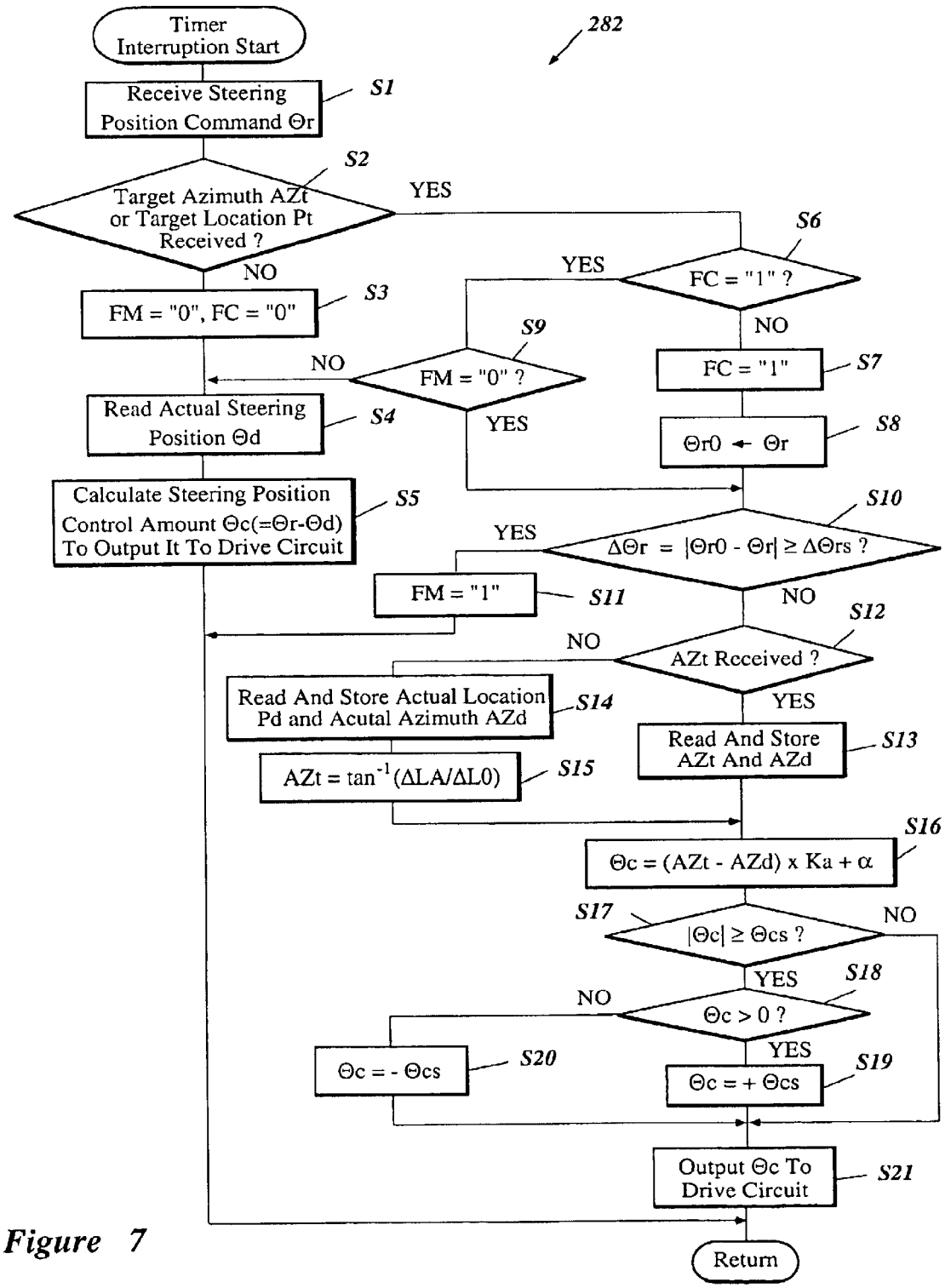
FIG. 7 illustrates a flow chart of an embodiment of a timer interruption program for a steering control process executed by the engine control node.

With reference to FIG. 7, the microcomputer 206 of the engine control node 100 executes a steering control process to provide the steering position control amount èc with which the steering actuator 57 is operated. This process, which is executed when the watercraft is in the autopilot control mode, also determines whether the operator has turned the steering wheel by a sufficient amount to trigger a change to the manual control mode. The steering control process may be implemented within software executed by the engine control node 100. The steering control process may alternatively be implemented in-whole or in-part within application-specific circuitry, and/or within software executed by a different component. The steering control process in the preferred embodiment is executed by a timer interruption program 282. The engine control node 100 preferably interrupts a primary control program, which is already running, every preset time period (e.g., 50 msec) to execute the timer interruption program 282. The steering control process starts when the main relay of the main switch unit is activated and the electric power is supplied to the engine control node 100. The main relay is activated when the operator inserts the switch key into the switch key recess 178 and turns the key to a power supply position which is located before an engine start position.

The engine control node 100, at a step S1, receives a transfer frame from the steering control node 170. The engine control node 100 extracts a steering position command èr from the data field of the transfer frame and stores the steering position command èr in a steering position command storage area of the storage of the computing processing unit 214. The program 282 then goes to a step S2.

At the step S2, the engine control node 100 determines whether a transfer frame that carries a target azimuth AZt or a target location Pt in the data field has been received from the panel unit node 190. The target azimuth AZt and the target location Pt can be entered through the autopilot target amount input unit 186. The target location Pt preferably comprises a target longitude LOt and a target latitude LAt. If the determination is negative and the engine control node 100 has received another transfer frame that does not carry the target azimuth AZt or the target location Pt, the program 282 goes to a step S3 because the operator has selected the manual steering control mode by the mode selector 184 as described below with reference to FIG. 8.

The engine control node 100, at the step S3, resets both of a mode change flag FM and an autopilot state flag FC to "0." The mode change flag FM designates, if set to "1," that a mode change is made. In the illustrated embodiment, the mode change flag FM substantially designates that a mode change is made to the manual control mode from the autopilot control mode. In other words, the mode change flag FM cancels the autopilot control mode and reinstates the manual control mode. The autopilot state flag FC designates, if set to "1," that the autopilot control mode continues.

At the step S4, the engine control node 100 receives an actual steering position signal èd from the steering position sensor 112 and stores the steering position signal èd in an actual steering position storage area of the storage of the computing processing unit 214. Then, the program 282 goes to a step S5.

The engine control node 100, at the step S5, calculates a steering position control amount èc based upon the steering position command èr stored at the step S1 and the actual steering position èd stored at the step S4 using the following equation (1):

$$\grave{e}c = \grave{e}r - \grave{e}d \tag{1}$$

The engine control node 100 outputs the steering position control amount èc to the drive circuit 58 of the steering mechanism 54. The program 282 temporarily ends and returns control to the primary control program.

On the other hand, if the determination at the step S2 is positive and the engine control node 100 has received a transfer frame that carries a target azimuth AZt or a target location Pt, the program 282 goes to a step S6 because the operator has selected the autopilot control mode. The engine control node 100, at the step S6, determines whether the autopilot state flag FC has been set to "1."

If the determination at the step S6 is negative, the program 282 goes to a step S7 to set the autopilot state flag FC to "1." After setting the autopilot state flag FC to "1," the program 282 goes to a step S8. At the step S8, the engine control node 100 stores the current steering position command èr as a steering position command reference èr0 in a steering position command reference storage area of the storage of the computing processing unit 214. The program 282 then goes to a step S10.

If the determination at the step S6 is positive, the program 282 jumps to a step S9 to determine whether the mode change flag FM is reset to "0" meaning that no mode change has been made. If the determination at the step S9 is negative and the mode change flag FM has been set to "1," the program 282 goes to the step S4 because the operator has changed the autopilot control mode to the manual control mode in a previous execution of the program 282. The mode change flag FM can be set to "1" at a step S11 that will be described shortly. If the determination at the step S9 is positive and the mode change flag FM is maintained at "0," the program 282 goes to the step S10 because the operator intends to keep the watercraft in the autopilot control mode.

At the step S10, the engine control node 100 determines whether a steering position difference Äèr is equal to or greater than a preset command threshold Äèrs. The steering position difference Äèr is an absolute value of a difference between the steering position command reference èr0 and the steering position command èr. That is, the steering position difference Äèr can be calculated by the following equation (2):

$$\ddot{A}\grave{e}r = |\grave{e}r0 - \grave{e}r| \tag{2}$$

Assuming that the program 282 reaches the step S10 through the step S8, the steering position command reference èr0 is equal to the steering position command èr and the steering position difference Äèr is "0." On the other hand, if the program 282 reaches the step S10 through the step S9, the steering position difference Äèr can be greater than or still equal to "0" and also be greater or less than or equal to the preset command threshold Äèrs because the steering position command reference èr0 has been set in the last execution of the program 282 and the current steering position command èr is different from the steering position command èr that was used to set the steering position command reference èr0.

If the determination at the step S10 is positive, meaning that the steering position difference Äèr is equal to or greater than the preset command threshold Äèrs, the program 282 goes to a step S11 because the operator has turned the steering wheel a sufficient amount to trigger a change from the autopilot control mode to the manual control mode. The engine control node 100, at the step S11, sets the mode change flag FM to "1." The program 282 then temporarily ends and returns control to the primary control program. Note that a steering control position value θc is not output to the drive circuit in this scenario because the operator has taken control of the steering.

If the determination at the step S10 is negative and the steering position difference Äèr is less than the preset command threshold Äèrs, the program 282 goes to a step S12 because the operator intends to keep the autopilot control mode and does not operate the steering wheel 166 accordingly.

Because the determination at the step S10 can be positive only when the steering position difference Äèr is equal to or greater than the preset command threshold Äèrs, the operator can efficiently and intuitively control whether a switch to the manual control mode occurs through operation (or inoperation) of the steering wheel. For example, to quickly change the course of the watercraft while in autopilot control mode, the operator can simply turn the steering wheel a sufficient amount to trigger the mode change.

If the determination at step S10 is negative, the engine control node 100, at the step S12, determines whether a transfer signal that carries the target azimuth AZt in the data field has been received from the panel unit node 190. If the determination is positive and the target azimuth AZt has been received, the program 282 goes to a step S13 because the operator has entered the target azimuth AZt rather than the target location Pt. Although the desired course may be specified in terms of either target azimuth or target location in the preferred embodiment, only one of these two formats may be supported in other embodiments. Further, the system may support other methods for allowing the operator to specify the desired course, including entry of time or distance values used for triangulation calculations.

At the step S13, the engine control node 100 extracts the target azimuth AZt from the data field of the transfer frame and stores the target azimuth AZt in a target azimuth storage area of the storage of the computing processing unit 214. Also, the engine control node 100 receives an actual azimuth signal AZd from the azimuth sensor 114 and stores the azimuth signal AZd in an actual azimuth storage area of the storage of the computing processing unit 214. The program 282 then goes to a step S16.

If the determination at the step S12 is negative and the target azimuth AZt has not been received, the program 282 goes to a step S14 because the operator has entered the target location Pt rather than the target azimuth AZt. The target location Pt is preferably specified as a target longitude LOt and a target latitude LAt.

The engine control node 100, at the step S14, receives a present location signal Pd from the location sensor (GPS) 115 and a present azimuth signal AZd from the azimuth sensor 114. The engine control node 100 then stores the present location signal Pd and the present azimuth signal AZd in an actual location storage area and the actual azimuth storage area, respectively, of the storage of the computing processing unit 214. The program 282 goes to a step S15.

At the step S15, the engine control node 100 calculates the target azimuth AZt based upon the target location Pt and the present location Pd using the following equation (3):

$$AZt = \tan^{-1}(\ddot{A}LAt/\ddot{A}LOt) \tag{3}$$

In the equation (3), the numerator $\ddot{A}LAt$ is a latitude difference given by subtracting a present latitude LAd from a target latitude LAt (i.e., $\ddot{A}LAt=La-LAd$). Also, the denominator $\ddot{A}LOt$ is a latitude difference given by subtracting a present latitude LAd from a target latitude LOt (i.e., $\ddot{A}LOt=LOt-LOd$). The engine control node 100 stores the calculated target azimuth AZt in the target azimuth storage area of the storage of the computing processing unit 214. The program 282 then goes to the step S16.

The engine control node 100, at the step S16, calculates a steering position control amount èc based upon the target azimuth AZt and the present azimuth AZd using the following equation (4):

$$`ec=(AZt-AZd)\times Ka+\grave{a} \qquad (4)$$

The value "Ka" is a change coefficient or scaling factor and "à" is an adjustment coefficient. The engine control node 96 stores the calculated steering position control amount èc in a steering position control amount storage area of the storage of the computing processing unit 214. The program 282 then goes to a step S17 to determine whether an absolute value of the steering position control amount èc is equal to or greater than a preset control amount threshold ècs. The control amount threshold ècs preferably is predetermined at a proper angle position that does not compel the watercraft 30 to sharply turn and rather allows the watercraft 30 to moderately or gradually turn.

If the determination at the step S17 is positive, the program 282 goes to a step S18 to determine whether the steering position control amount èc is greater than "0." In other words, the engine control node 100 determines whether the steering wheel 166 is turned clockwise or counter-clockwise relative to its most recently recorded position at the step S18.

If the determination at the step S18 is positive and the steering wheel 166 is turned clockwise relative to its most recently recorded position, the program goes to a step S19. At the step S19, the engine control node 100 sets a positive value of the control amount threshold +ècs as the steering position control amount èc and stores the steering position control amount èc in a steering position control amount storage area of the storage of the computing processing unit 214. If the determination at the step S18 is negative and the steering wheel 166 is turned counter-clockwise relative to its most recently recorded position, the program goes to a step S20. At the step S20, the engine control node 100 sets a negative value of the control amount threshold -ècs as the steering position control amount èc and stores the steering position control amount èc in a steering position control amount storage area of the storage of the computing processing unit 214. Then, the program 282 goes to a step S21.

At the step S21, the engine control node 100 outputs the steering position control amount èc set either at the step S19 or the step S20 to the drive circuit 58 of the steering mechanism 54 to appropriately adjust the course of the watercraft. The program 282 temporarily ends and returns to the control of the primary control program.

Figure 8:
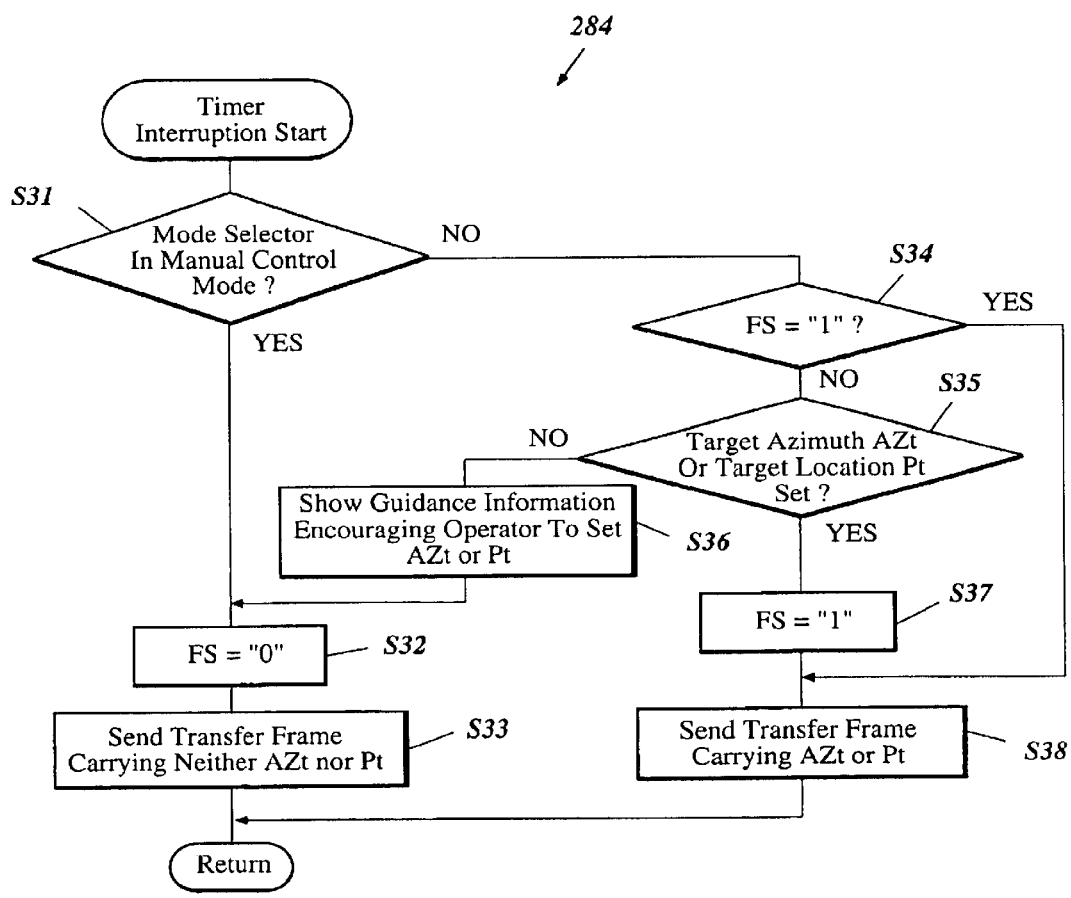
FIG. 8 illustrates a flow chart of an embodiment of a timer interruption program for a transfer frame creating and transferring process executed by the panel unit node.

With reference to FIG. 8, the microcomputer 206 of the panel unit node 190 executes a frame transferring control process to transfer a frame to the engine control node 100 for processing according to FIG. 7. The frame transferring process may be implemented within software executed by the panel unit node 190. The frame transferring process in this embodiment is executed by a timer interruption program 284. The panel unit node 190 preferably interrupts the primary control program every preset time period (e.g., 50 msec) to execute the timer interruption program 284. The frame transferring control process starts when the main relay of the main switch unit is activated and the electric power is supplied to the panel unit node 190. The process depicted in FIG. 8 functions generally by checking the state of the mode selector, and if set to the autopilot control mode state, either (1) sending the operator-specified target azimuth or target location to the engine control node, or (2) prompting the operator to specify the target azimuth or target location.

The panel unit node 190, at a step S31, determines whether the mode selector 184 is turned to or otherwise set in the manual control mode position (or in the "OFF" position). If the determination is positive and the manual control mode is selected, the program 284 goes to a step S32.

At the step S32, the panel unit node 190 resets an autopilot selected flag FS to "0," or maintains FS at "0," because the manual control mode is selected. The autopilot selected flag FS designates, if set to "1," that the operator has selected the autopilot control mode by the mode selector 184. The program 284 then goes to a step S33. The panel unit node 190, at the step S33, creates a transfer frame that does not carry any one of the target azimuth AZt and the target location Pt in the data field and transfers the frame into the bus 198. The program 284 temporarily ends and returns controls to the primary control program.

On the other hand, if the determination at the step S31 is negative and the autopilot control mode is selected, the program 284 jumps to a step S34. At the step S34, the panel unit node 190 determines whether the autopilot selected flag FS is set to "1." If the determination at the step S34 is negative meaning that the autopilot selected flag FS is reset to "0," the program 284 goes to a step S35 to determine whether the target azimuth AZt or the target location Pt has been inputted through the autopilot target amount input unit 186.

If the determination at the step S35 is negative (i.e., neither the target azimuth AZt nor the target location Pt has been entered yet), the program 284 goes to a step S36. The panel unit node 190, at the step S36, encourages the operator to input the target azimuth AZt or the target location Pt. Preferably, the display 182 is employed to show some guidance or messages that encourages the operator to input the target information through the autopilot target amount input unit 186. Alternatively or additionally, a buzzer can be used to call the operator's attention. The program 284 then goes to the step S32 to execute the step S32.

If the determination at the step S35 is positive and the target azimuth AZt or the target location Pt has already been entered, the program 284 goes to a step S37. At the step S37, the panel unit node 190 sets the autopilot selected flag FS to "1" because the operator selected the autopilot control mode. The program 284 then goes to a step S38.

The panel unit node 190, at the step S38, creates a transfer frame that carries the target azimuth AZt or the target location Pt in the data field and transfers the frame onto the bus 198. The target azimuth AZt or the target location Pt was entered through the autopilot target amount input unit 186. The program 284 temporarily ends and returns control to the primary control program.

If the determination at the step S34 is positive (i.e., the autopilot selected flag FS is set to "1"), the program 284 jumps to the step S38.

With reference to FIGS. 7 and 8, an example scenario illustrating the operation of the steering control system is described below.

Initially, the watercraft 30 is standstill or berthed at a pier of a harbor or mooring place with the port side of the watercraft 30 facing the pier. No electric power is supplied to the respective nodes 100, 152, 158, 170, 190, 192, 200 and other electrical equipment of the watercraft 30 at this moment. The remote control lever 160 is set at the neutral position N. Under these conditions, the operator inserts the switch key into the switch key recess 178 and turns the switch key to the power supply position. The respective nodes 100, 152, 158, 170, 190, 192, 200 and other electrical equipment thus are activated. The management node 200 assigns a physical address or network address to each terminal node 100, 152, 158, 170, 190, 192. Accordingly, the respective terminal node 100, 152, 158, 170, 190, 192 now can communicate with each other in the network 32 by transferring transfer frames.

Because the remote control lever 160 is placed at the neutral position N, the throttle valve position command THr provided by the remote controller node 158 designates "0" that corresponds to the closed position of the throttle valves 84. Also, the shift position command Sr designates the neutral position N. The remote controller node 158 sends a transfer frame that has the throttle valve position command THr and the shift position command Sr in the data field to the bus 198.

The engine control node 100 extracts the throttle valve position command THr from the transfer frame and stores the throttle valve position command THr in its storage. The engine control node 100 also receives an actual throttle valve position signal THd from the throttle valve position sensor 118 and stores the actual throttle valve position THd in its storage. Then, the engine control node 100 calculates a throttle valve position control amount THc that makes the actual throttle valve position THd coincide with the throttle position command THr and output the throttle valve position control amount THc to the actuator of the throttle valves 84. In the initial state, the throttle valves 84 are maintained in the closed position because the throttle valve position control amount THc is "0."

In this initial state, the mode selector 184 is in the physical position corresponding to the manual control mode. Neither the target azimuth AZt nor the target location Pt has been entered yet through the autopilot target amount input unit 186. The program 284 of FIG. 8 performs the steps S31, S32 and S33 when the program 284 runs. The panel unit node 190 thus creates a transfer frame that does not carry the target azimuth AZt or the target location Pt in the data field and sends the transfer frame to the bus 198.

Also, the steering control node 170 creates a transfer frame that carries a steering position command èr corresponding to an angular position of the steering wheel 166 in the data field and sends the position command èr to the bus 198. The engine control node 100 receives the transfer frame from the steering control node 170 at the step S1 when the program 282 of FIG. 7 runs. The engine control node 100 extracts the steering position command èr and stores the steering position command èr in its storage.

The determination at the step S2 of FIG. 7 is negative because neither the target azimuth AZt nor the target location Pt is contained in the data field of the transfer frame from the panel unit node 190. The engine control node 100 resets both the mode change flag FM and the autopilot state flag FC to "0" at the step S3. The engine control node 100 receives an actual steering position signal èd and stores the actual steering position signal èd in its storage at the step S4. The engine control node 100 also calculates the steering position control amount èc based upon the position command signal èr and the actual position signal èd and outputs the steering position control amount èc to the drive circuit 58 of the steering mechanism 54 at the step S5.

The steering actuator or servomotor 57 is activated with the position control amount èc. In the initial state, the position command signal èr is "0" assuming that the steering wheel 166 is in the neutral position. Also, if the worm 56 meshes a central portion of the warm wheel 55 and the propulsion shaft 116 is consistent with the longitudinal axis of the watercraft 30, the actual position signal èd also is "0." Accordingly, the position-control amount èc is "0." The drive circuit 58 does not supply any electric current to the steering actuator 57. The actuator 57 thus keeps its standstill state.

The operator, then, turns the switch key to the engine start position and the engine is started. Because the throttle valves 84 are placed in the closed position, the engine operates at idle speed. Also, because the shift position command Sr indicates the neutral position N, the shift control node 152 controls the shift rod actuator 148 to keep the dog clutch unit disengaging either forward or reverse bevel gear 140, 142. Thus, the engine output does not drive the propeller 132 and the watercraft 30 still maintains its standstill state.

Under these conditions, the operator turns the steering wheel 166, for example, clockwise to leave the pier. A steering position command signal èr thus positively increases. The steering control node 170 creates a transfer frame that carries the steering position command èr in the data field and sends the transfer frame on the bus 198. The engine control node 100 receives the transfer frame and executes the steps S1-S5. Because the position command signal èr is greater than the present steering position èd, the position control amount èc calculated using the equation (1) at the step S5 is a positive value. The position control amount èc thus is provided to the drive circuit 58 of the steering mechanism 54 at the step S5. The drive circuit 58 drives the steering actuator 57 to actuate the steering shaft 52. The steering shaft 52 together with the housing unit 44 turns counter-clockwise by the angle corresponding to the position control amount èc. Accordingly, the watercraft 30 now is ready to turn in the right direction to leave the pier.

Almost simultaneously, the operator moves the remote control lever 160 to a certain position in the forward acceleration range GF through the forward troll position F from the neutral-position N. The remote controller node 158 creates a transfer frame that carries a throttle valve position command THr corresponding to the position in the forward acceleration range GF and a shift position command Sr designating the forward mode F and sends the transfer frame to the bus 198.

The shift control node 152 receives the transfer frame from the remote controller node 158 and controls the shift rod actuator 148 to have the clutch unit engage the forward bevel gear 140. The outboard motor 40 now operates in the forward mode F.

On the other hand, the engine control node 100 calculates a throttle valve position control amount THc to make the actual throttle valve position THd coincide with the throttle valve position command THr. The engine control node 100 then controls the throttle valve actuator to have the throttle valves 84 open to a position corresponding to the throttle valve position command THr. The operation of engine 38 thus is accelerated to an engine speed corresponding to the throttle valve position command THr. The watercraft 30 leaves the pier and proceeds forward accordingly.

The operator can select the autopilot control mode while, for example, the watercraft 30 cruises on the open sea after departing the harbor or mooring place. For instance, the operator sets a desired target azimuth AZt through the autopilot target amount input unit 186 for the autopilot control mode rather than a desired target location Pt. After completing the setting of the target azimuth AZt, the operator releases the steering wheel 166 and turns the mode selector 184 to the autopilot control mode position (or to the "ON" position). If the mode selector 184 is the one-position switch, the operator pushes the movable contact.

The determination at the step S31 executed by the panel unit node 190 becomes negative. The program 284 of FIG. 8 goes to the step S34. Because the autopilot selected flag FS is reset to "0" under the initial condition, the program 284 goes to the step S35. The program 284 then goes to the step S37 because the target azimuth AZt has been set. The panel unit node 190 sets the autopilot selected flag FS to "1" at the step S37. The panel unit node 190, at the step S38, creates a transfer frame carrying the target azimuth AZt in the data field and sends the transfer frame to the bus 198.

The determination at the step S2 executed by the engine control node 100 now becomes positive and the program 282 of FIG. 7 goes to the step S6. Because the autopilot state flag FC is reset to "0" under this condition, the program 282 goes to the step S7 to set the autopilot state flag FC to "1." The engine control node 100, at the step S8, stores the present position command signal èr as a position command reference èr0 in the storage thereof. The engine control node 100 then executes the step S10. Additionally, from the next execution after this first execution, the program 282 reaches the step S10 through the step S9 instead of the steps S7 and S8 because the autopilot state flag FC has been set to "1."

At the first execution of the step S10, the position command reference èr0 is the same as the position command signal èr. The steering position difference Äèr calculated by the equation (2) is of course less than the preset command threshold Äèrs. The steering position difference Äèr is still less than the preset command threshold Äèrs in the next execution of the step S10 because the operator has released the steering wheel 166. This situation continues until the operator turns the steering wheel 166 later. The program 282 goes to the step S12.

Because the engine control node 100 has received the target azimuth AZt, the determination at the step S12 becomes positive. Thus, the engine control node 100, at the step S13, extracts the target azimuth AZt and stores the target azimuth Azt in its storage. Also, the engine control node 100 stores an actual azimuth AZd received from the azimuth sensor 114 in the storage thereof at the step S13. The program 282 then goes to the step S16.

The engine control node 100 calculates the steering position control amount èc using the equation (4) at the step S16. If the calculated position control amount èc is less than the preset control amount threshold ècs, the determination at the step S17 is negative and the engine control node 100 provides the calculated position control amount èc to the drive circuit 58 at the step S21. If the calculated position control amount èc is greater than the preset control amount threshold ècs, the determination at the step S17 is positive and the engine control node 100 further determines whether the position control amount èc is greater than "0." If the determination at the step S18 is positive, the engine control node 100 provides the positive value of the preset control amount threshold ècs to the drive circuit 58 at the step S21 through the step S19. If, on the other hand, the determination at the step S18 is negative, the engine control node 100 provides the negative value of the preset control amount threshold ècs at the step S21 through the step S20.

The drive circuit 58 then drives the steering actuator 57 to turn the steering shaft 52 either clockwise or counter-clockwise. More specifically, if the provided position control amount èc is the exact position control amount èc, the steering shaft 52 turns clockwise or counter-clockwise in accordance with the calculated position control amount èc. If the provided position control amount èc is the positive amount of the preset control amount threshold ècs, the steering shaft 52 turns counter-clockwise (in the top plan view of FIG. 1) in accordance with the preset control amount threshold ècs. If the provided position control amount èc is the negative amount of the preset control amount threshold ècs, the steering shaft 52 turns clockwise (in the top plan view of FIG. 1) in accordance with the preset control amount threshold ècs. That is, the change of the steering angle per execution of the program 282 is regulated not to exceed the control amount threshold ècs in both the clockwise and the counter-clockwise direction.

The watercraft 30 turns toward the steering angle corresponding to the steering position command èr. If the position control amount èc is less than the preset control amount threshold ècs, the actual steering position èd catches up the steering position command èr very soon. If the position control amount èc is greater than the preset control amount threshold ècs, the actual steering position èd gradually changes to coincide with the steering position command èr, and sooner or later the actual steering position èd catches up the steering position command èr. Thus, the watercraft 30 moderately change its direction toward the desired direction.

As thus described, in the illustrated embodiment, the steering position control amount èc is regulated at an amount corresponding to the positive or negative control amount threshold ècs. Because of this regulated control amount èc and the moderate turn of the watercraft 30, the operator and passengers, if any, will not experience any unexpected side-to-side rolling by the watercraft 30.

In the course of time, the actual azimuth Azd coincides with the target azimuth AZt. As a result, the steering position control amount èc becomes almost "0." The steering actuator 57 thus stops actuating the steering shaft 52. Afterwards, the engine control node 100 maintains the watercraft pointed in the direction corresponding to the target azimuth AZt in the autopilot control mode.

Under these conditions, if the operator wants to change the direction of the watercraft 30, the operator simply turns the steering wheel 166 clockwise or counterclockwise toward a desired direction. The steering position command èr increases (or decreases) in accordance with a turned angle of the steering wheel 166. The determination at the step S10 becomes positive because the steering position difference Äèr calculated by the equation (2) becomes greater than the preset command threshold Äèrs. The engine control node 100 sets the mode change flag FM to "1" at the step S11.

In the next execution of the program 282, the determination at the step S2 is still positive because the mode selector 184 is still in the autopilot control mode. The determination at the step S6 is positive because the autopilot state flag FC has been set to "1." The determination at the step S9 in turn becomes negative because the mode change flag FM has been set to "1" in the previous execution of the program 282. The engine control node 100 thus performs the steps S4 and S5 to provide the steering position control amount èc calculated by the equation (1) to the drive circuit 58. The steering actuator 57 actuates the steering shaft 52 to have the actual steering position èd coincide with the steering position command èr. That is, the watercraft is automatically changed to the manual control mode even though the mode selector 184 is still set to the autopilot control mode position.

The automatic change to the manual control mode from the autopilot control mode is advantageous because the operator does not need to operate the mode selector 184 to make the transition, and can therefore make this transition more rapidly. Particularly, the automatic mode change is quite advantageous if the circumstances require the operator to promptly change the watercraft's direction.

Afterwards, the engine control node 100 keeps the watercraft in the manual control mode inasmuch as the autopilot state flag FC is set to "1" and the mode change flag FM is set to "1." If the operator wants to return to the autopilot control mode again, the operator turns the mode selector 184 to the manual control mode position once and then turns the mode selector 184 back to the autopilot control mode position. With the first turn of the mode selector 184 (to the manual position), the determination at the step S2 becomes negative because the panel unit node 190 performs the steps S31, S32 and S33. The engine control node 100 thus sets both of the autopilot state flag FC and the mode change flag FM to "0" at the step S3. Then, with the second turn of the mode selector 194 (back to the autopilot position), only the autopilot state flag FC is newly set to "1" at the step S7 because the panel unit node 190 sends another transfer frame that has the target azimuth AZt at the step S38. The autopilot control mode is then re-entered accordingly.

Additionally, if the foregoing one-position switch is used, the operator can simply push the movable contact of the switch twice to return to the autopilot control mode.

Assuming that the operator has not turned the steering wheel 166 in the autopilot control mode and maintains the autopilot control mode through the entire cruise of the watercraft 30, the operator turns the mode selector 184 to the manual control mode position when the watercraft 30 returns to the harbor or reaches another desired location. In this situation, the determination at the step S2 becomes negative because the panel unit node 190 traces the steps S31, S32 and S33. The engine control node 100 thus sets both of the autopilot state flag FC and the mode change flag FM to "0" at the step S3. That is, the manual control mode is re-entered.

With continued reference to FIGS. 7 and 8, the operator may set a desired target location Pt through the autopilot target amount input unit 186 for the autopilot control mode rather than the desired target azimuth AZt. After completing the setting of the target location Pt, the operator releases the steering wheel 166 and sets the mode selector 184 to the autopilot control mode state. The panel unit node 190 creates a transfer frame that carries the target location Pt in the data field at the step S38.

The determination at the step S2 is positive. The program 282 performs the steps S6–S8 and S10 (or the steps S6, S9 and S10 in the second or later executions of the program 282) and reaches the step S12. The determination at the step S12 is negative because no target azimuth AZt is received. The program 282 thus goes to the step S14. The engine control node 100, at the step S14, receives a present location Pd from the location sensor (GPS) 115 and a present azimuth AZd from the azimuth sensor 114 and stores the present location Pd and the present azimuth AZd in the storage.

The engine control node 100 then calculates a target azimuth AZt using the equation (3) at the step S15. The program 282 goes to the step S16 to calculate a steering position control amount èc. Afterwards, the program 282 reaches the step S21 in the same way as described above with regard to the situation in which the target azimuth AZt is set through the autopilot target amount input unit 186. The watercraft 30 thus cruises in the autopilot control mode accordingly.

Figure 9:
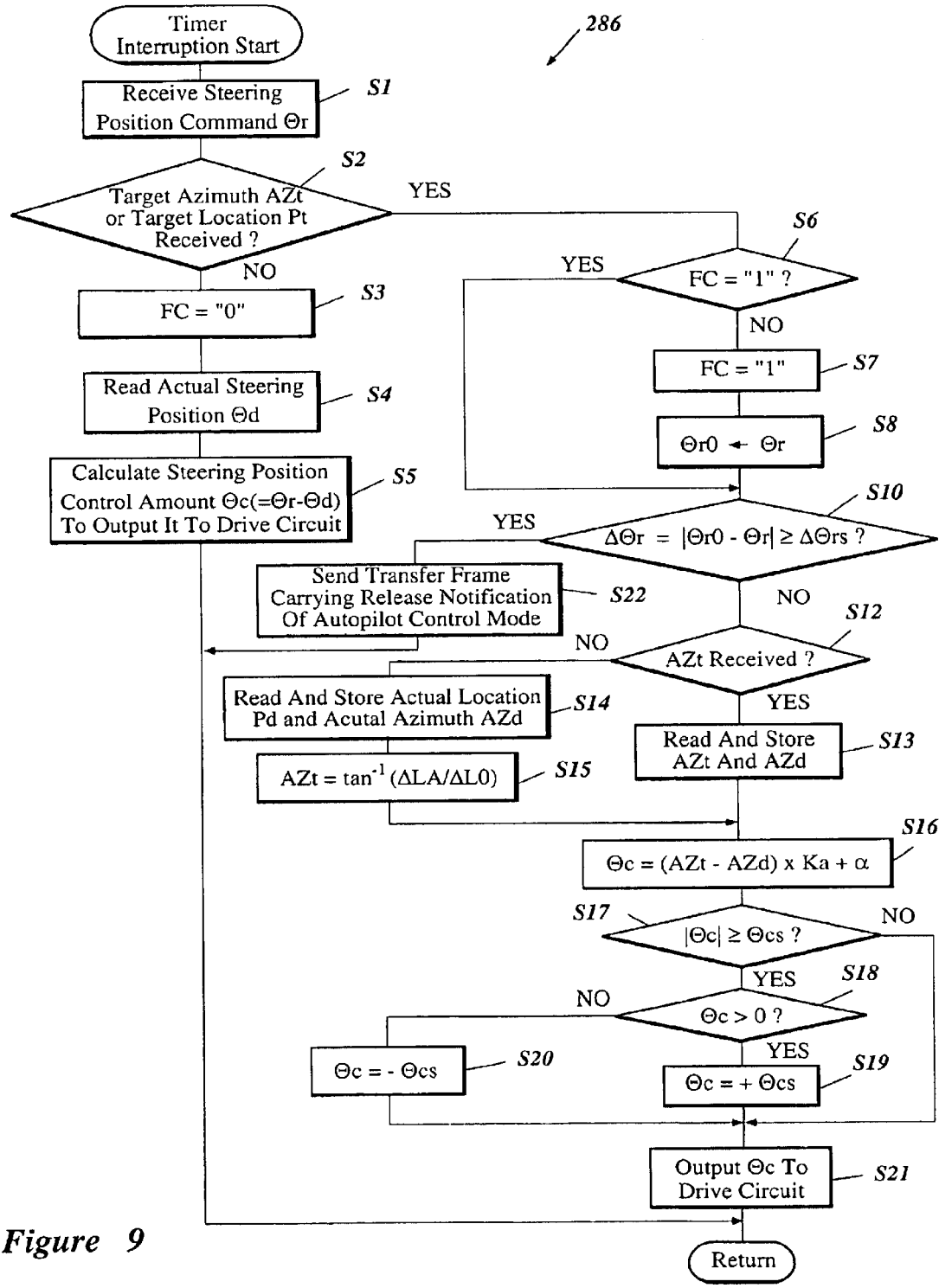
FIG. 9 illustrates a flow chart of another embodiment of the timer interruption program modified from the embodiment of FIG. 7.
Figure 10:
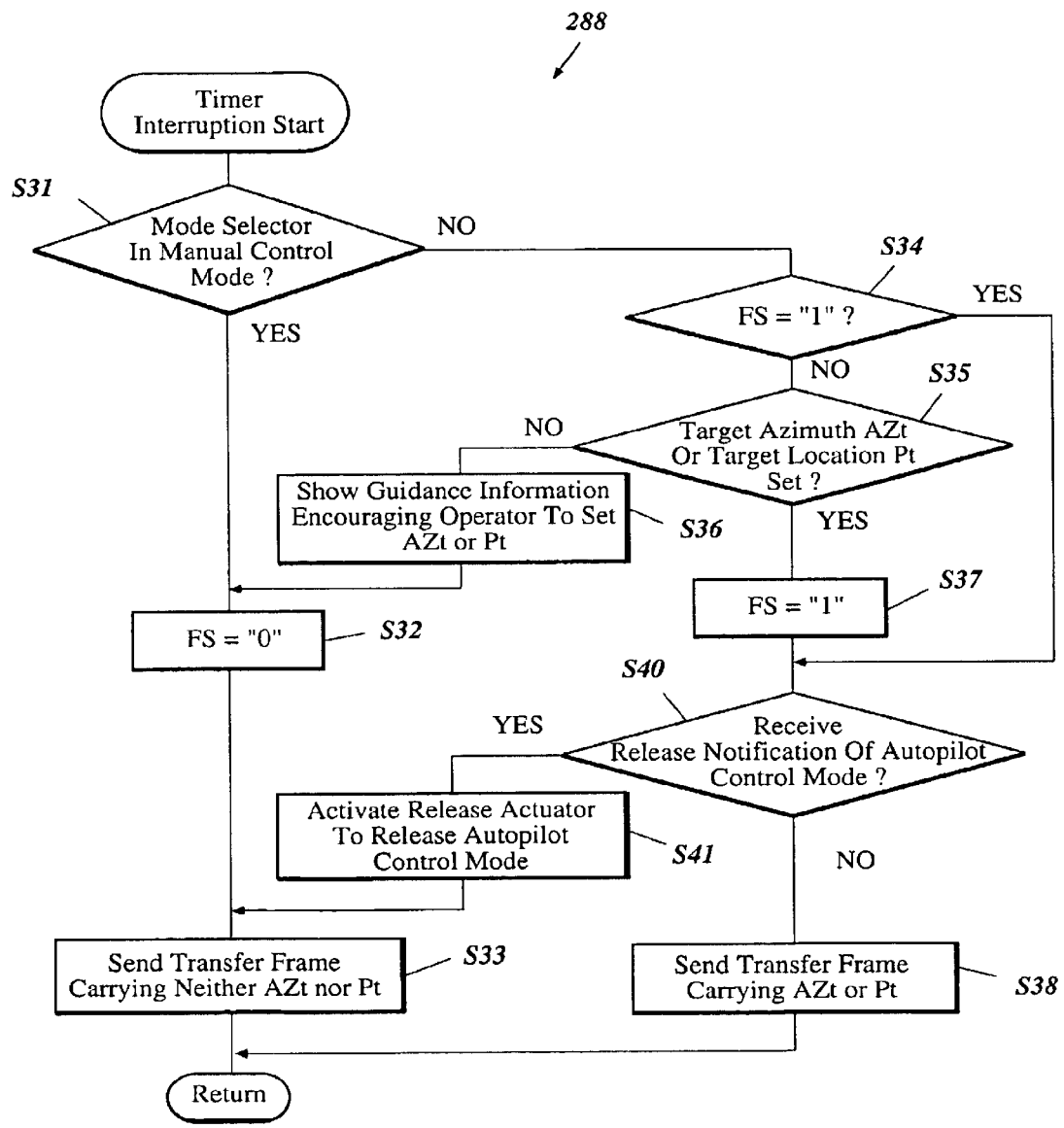
FIG. 10 illustrates a flow chart of another embodiment of the timer interruption program modified from the embodiment of FIG. 8 in relation to the program of FIG. 9.

With reference to FIGS. 9 and 10, a modified embodiment is described below. The same devices, components, members, amounts and steps described above are assigned with the same reference numerals or marks and will not be described repeatedly.

In this modified embodiment, the mode selector 184 is automatically and mechanically returned to the manual control mode position when the autopilot control mode is changed to the manual control mode as the result of operator movement of the steering wheel. For example, a self-lock type push switch preferably replaces the two-position switch of the first embodiment. A release actuator (not shown) is provided to release the switch to the manual control mode position from the autopilot control mode position. The release actuator in this embodiment comprises an electro-magnetic solenoid. The push switch can be mechanically locked in the autopilot control mode position when the operator pushes the switch. The release actuator coercively releases the switch from the locked position to the manual control mode position corresponding to an unlocked position when the panel unit node 190 controls the actuator to release the switch.

The modified embodiment makes use of a timer interruption program 286 of FIG. 9 and a timer interruption program 288 of FIG. 10. In the program 286, the step S9 of the program 282 of FIG. 7 is omitted. The step S3 of the program 282 is modified to omit setting of the mode change flag FM and merely to set the autopilot state flag FC to "0." Also, a step S22 replaces the step S11 of the program 282 to create a transfer frame carrying a release notification of the autopilot control mode that indicates that an autopilot control mode has been released and the manual control mode has been reinstated.

In the program 288, steps S40 and S41 are added to execute the release of the push switch after the determination at the step S34. The panel unit node 190, at the step S40, determines whether the release notification of the autopilot control mode has been received. If the determination is positive, the program 288 goes to the step S41 to activate the release actuator that releases the push switch. The program 288 then goes to the step S33. If the determination at the step S40 is negative and the release notification of the autopilot control mode has not been received, the program 288 goes to the step S38.

If the operator turns the steering wheel 166 by a sufficient amount to change from the autopilot control mode to the manual control mode, the steering position difference Äèr becomes equal to or greater than the preset command threshold Äèrs. Thus, the determination at the step S10 becomes positive and the program 286 goes to the step S22. The engine control node 100, at the step S22, creates the transfer frame carrying the release notification of the autopilot control mode and sends the transfer frame on the bus 198. The program 286 then temporarily ends and returns control to the primary control program.

On the other hand, the determination at the step S31 is negative because the mode selector 184, which now comprises the lock-type push switch (or a switch with equivalent functionality), is locked in the autopilot control mode position. The determination at the step S34 is positive because the autopilot selected flag FS is set to "1." Accordingly, the panel unit node 190, at the step S40, determines whether the release notification of the autopilot control mode has been received. The determination at the step S40 is positive. The panel unit node 190 activates the release actuator to release the push switch from the locked position, i.e., the autopilot control mode position to the manual control mode position. The panel unit node 190 then executes the step S33 and temporarily ends. The panel unit node 190 returns to the control of the primary control program.

As a result, the engine control node 100 reinstates the manual control mode because the determination at the step S2 was negative, and executed the steps S3-S5 and returns control to the primary control program.

Assuming that the operator always maintains the autopilot control mode and never changes from the autopilot control mode to the manual control mode by turning the steering wheel 166, the operator theoretically needs to push the switch to return to the manual control mode position. Most likely, however, the operator will turn the steering wheel 166 or other manual steering device to adjust the watercraft's position in the harbor so as to moor the watercraft 30 in a desired place. Thus, in most situations, the operator does not need to push the switch to reinstate the manual control mode position because the switch automatically returns to the manual control mode position. Even if the operator does not turn the steering wheel 166 in placing the watercraft to the desired position and the watercraft starts proceeding without the switch changed to the manual control mode position, the switch inevitably and automatically returns to the manual control mode position when the operator turns the steering wheel 166 at any moment in the next departure or cruise.

One variation that can be made to the steering control system is to automatically reinstate the autopilot control mode after the operator is deemed to have finished operating the steering device 164. With this approach, the operator can temporarily disable the autopilot control mode by turning the steering wheel, and then release the steering wheel to cause the watercraft to re-enter the autopilot mode after a short delay (e.g., 3 seconds). Thus, for example, the operator can make a temporary course adjustment to avoid debris floating in the water, without having to thereafter operate the mode control switch to reinstate the autopilot mode. Upon re-entering the autopilot control mode, the system may output a sound and/or display a message to notify the operator that the autopilot control mode has been re-entered. In scenarios in which the operator continues to manually steer the watercraft for some threshold period of time (e.g., 30 seconds), automatic re-entry of the autopilot control mode may be disabled based on the assumption that the operator no longer wishes to use the autopilot control mode.

Figure 11:
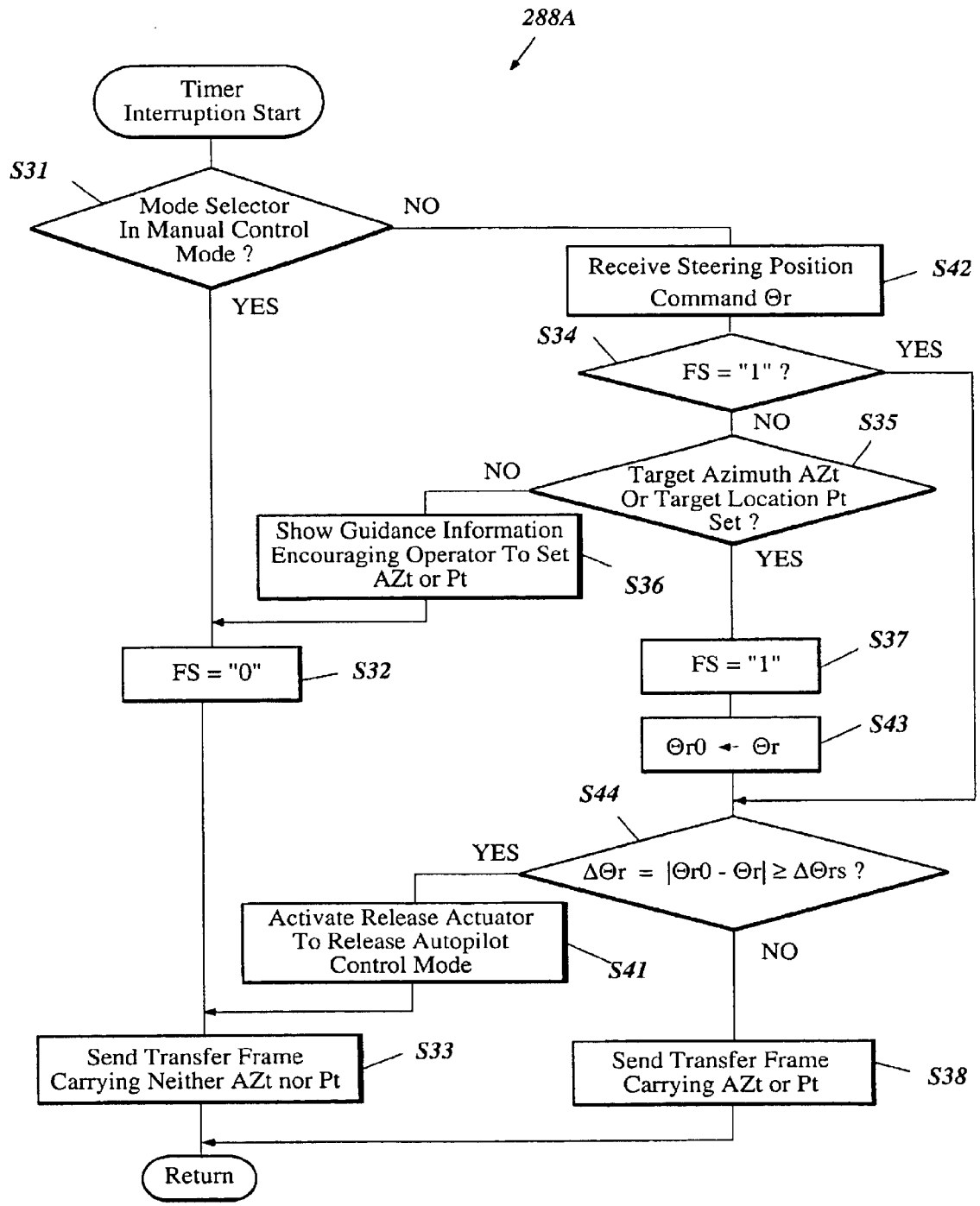
FIG. 11 illustrates a flow chart of a variation of the modified embodiment of FIG. 10.

With reference to FIG. 11, the panel unit node 190 can determine, instead of the engine control node 100, whether a change from the autopilot control mode to the manual control mode should be made. A timer interruption program 288A, which is a variation of the program 288 of FIG. 10, can make this determination.

In the alternative program 288A, the step S1 of the program 282 of FIG. 7 is added as a step S42 between the step S31 and the step S34 of the program 288 of FIG. 10. Also, the step S8 of the program 282 is added as a step S43 after the step S37 of the program 288. Further, the step 10 of the program 282 as a step 44 replaces the step S40 of the program 288. Accordingly, the program 282 starts at the step S2 because the step S1 is moved to the program 288A. After the step S7 or the step S9, the program 282 goes to the step S12 because the steps S8 and S10 move to the program 288A. The alternative program 288A together with the program 282 that is changed as above can execute substantially the same operation as the program 288 of FIG. 10 and the program 286 of FIG. 7.

In a similar manner, steps of one program can be moved to another program. For example, the panel unit node 190 can transfer a transfer frame carrying the autopilot selected flag FS and the target azimuth AZt or the target location Pt to the engine control node 100, and the engine control node 100 can control the steering position based upon the autopilot selected flag FS and the target azimuth AZt or the target location Pt. Further, as mentioned above, all of the various steps could be combined into a single program executed by a single processor.

The steering device 164 can employ any component or member in place of the steering wheel 166. For example, a control stick can replace the steering wheel.

The steering mechanism 54 can employ any mechanism in place of the combination of the worm wheel and worm 55, 56. For example, a mechanism using one or more plane gears, bevel gears, sprockets, pulleys, chains or belts can be employed.

A hydraulic system can replace the steering mechanism 54. In this variation, a hydraulic actuator can be used in place of the steering actuator 57.

The azimuth sensor 114 can be omitted because a present azimuth AZd can be calculated based upon a location information from the location sensor (GPS) 115. In addition, other location sensors such as, for example, a receiver of LORAN (Long-range navigation) A or B can replace the GPS.

The autopilot target amount input unit 186 can be designed to maintain the data of the target azimuth AZt and/or the target location Pt after the power is turned off. Preferably, however, the data can be deleted when the power is off to avoid an unintentional use of the autopilot control mode with the previous data.

Any conventional switch or switches can be used as the mode selector 184. The conventional switches can include mechanical switches and hybrid switches that comprise mechanical switch elements and electrical circuit elements.

The engine 38 can be based on other operation principles. For example, a two-cycle engine can replace the four-cycle engine. In addition, an inboard engine may be used, and/or multiple engines may be used.

The shift control unit or node can control the steering mechanism instead of the engine control unit or node. Also, a single control unit or node can control all of the engine, the changeover mechanism and the steering mechanism which are disposed on the outboard motor side.

The changeover mechanism 136 can be mechanically controlled. For example, the shift rod actuator 148 can be omitted and a mechanical cable movable along with the movement of the remote controller lever can actuate the shift rod 144.

The network system using the LAN (including CAN) is useful to realize the rapid, smooth and precise communications and controls and also is useful to simplify wiring. However, the respective terminal nodes can be connected with each other by any communication measures. For example, electric wire harnesses can be used. In this variation, the respective nodes can exchange data by electrical signals rather than the transferring frames. Further, the various signals and commands can be transferred wirelessly such as by RF communications.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described, other modifications, which are within the scope of this invention, will be readily apparent to those of skill in the art based upon this disclosure. It is also contemplated that various combination or sub-combinations of the specific features and aspects of the embodiments or variations may be made and still fall within the scope of the invention. It should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A watercraft comprising a rudder unit, a steering position input device configured to provide a position command signal indicative of a position of the rudder unit, at least one of an azimuth sensing device configured to sense an actual azimuth of the watercraft to provide an actual azimuth signal or a location sensing device configured to sense an actual location of the watercraft to provide an actual location signal, a control device configured to control the position of the rudder unit, a control data input device configured to selectively provide the control device with a first mode signal that starts a first mode of the control device and a second mode signal that starts a second mode of the control device, the second mode signal being accompanied by a target azimuth signal indicative of a target azimuth of the watercraft or a target location signal indicative of a target location of the watercraft, the control device controlling the position of the rudder unit based upon the position command signal in the first mode, the control device controlling the position of the rudder unit such that an actual azimuth amount designated by the actual azimuth signal generally coincides with a target azimuth amount designated by the target azimuth signal, and the control device starting the first mode in place of the second mode without the first mode signal if the position command signal changes while the control device controls the position of the rudder unit in the second mode.

2. The watercraft as set forth in claim 1, wherein the control device remains in the first mode when the control device changes from the second mode to the first mode without the first mode signal.

3. The watercraft as set forth in claim 1, wherein the second mode signal is canceled when the control device changes from the second mode to the first mode without the first mode signal.

4. The watercraft as set forth in claim 1, wherein the control data input device comprises a mode selector through which the first and second mode signals are selectively provided to the control device.

5. The watercraft as set forth in claim 4, wherein the control data input device additionally comprises a data input unit, the target azimuth signal or the target location signal is inputted by the data input unit.

6. The watercraft as set forth in claim 4, wherein the control data input device automatically returns the mode selector to a position in which the mode selector provides the first mode signal.

7. The watercraft as set forth in claim 6 additionally comprising an actuator, the mode selector including a switch movable between a first mode position corresponding to the first mode and a second mode position corresponding to the second mode, the actuator coercively returning the switch to the first mode position.

8. The watercraft as set forth in claim 1, wherein the control device controls the position of the rudder unit using a position control amount calculated based upon the actual azimuth amount and the target azimuth amount in the second mode.

9. The watercraft as set forth in claim 8, wherein the control device calculates the target azimuth amount based upon an actual location amount designated by the actual location signal and a target location amount designated by the target location signal.

10. The watercraft as set forth in claim 8, wherein the control device determines whether the position control amount is greater than a preset control amount threshold, the control device controls the rudder unit using the position control amount if the position control amount is equal to or less than the preset control amount threshold or another position control amount that does not exceed the preset position control amount threshold if the position control amount is greater than the preset position control amount threshold.

11. The watercraft as set forth in claim 1, wherein the control device controls the position of the rudder unit such that the actual azimuth amount gradually approaches the target azimuth amount.

12. The watercraft as set forth in claim 1 additionally comprising a position sensing device configured to sense an actual position of the rudder unit, the control device controlling the position of the rudder unit using a position control amount calculated based upon the position command signal provided by the command input device and an actual position sensed by the position sensing device in the first mode.

13. The watercraft as set forth in claim 1, wherein the control device changes the second mode to the first mode without the first mode signal when a difference between a position command amount designated by the position command signal and a position command reference amount is equal to or greater than a preset command threshold.

14. The watercraft as set forth in claim 1 additionally comprising a network system that has multiple nodes communicating with each other, the network system at least including a first node for the steering position input device, a second node for the azimuth sensing device or the location sensing device, a third node for the control device and a fourth node for the control data input device.

15. The watercraft as set forth in claim 1, wherein the rudder unit comprises a rudder and an actuator that actuates the rudder, the control device controls a position of the actuator to control the position of the rudder unit.

16. A watercraft comprising a rudder unit, a steering position input device configured to provide a position command signal indicative of a position of the rudder unit, at least one of a azimuth sensing device configured to sense an actual azimuth of the watercraft to provide an actual azimuth signal or a location sensing device configured to sense an actual location of the watercraft to provide an actual location signal, a control device configured to control the position of the rudder unit, a control data input device configured to selectively provide the control device with a first mode signal that starts a first mode of the control device and a second mode signal that starts a second mode of the control device, the second mode signal being accompanied by a target azimuth signal indicative of a target azimuth of the watercraft or a target location signal indicative of a target location of the watercraft, the control device controlling the position of the rudder unit based upon the position command signal in the first mode, the control device controlling the position of the rudder unit such that an actual azimuth amount designated by the actual azimuth signal generally coincides with a target azimuth amount designated by the target azimuth signal, and the control device controlling the rudder unit based upon the position command signal if the position command signal changes while the control device controls the rudder unit in the second mode.

17. A steering control system for a watercraft having a rudder unit comprising a steering position input device configured to provide a position command signal indicative of a position of the rudder unit, at least one of a azimuth sensing device configured to sense an actual azimuth of the watercraft to provide an actual azimuth signal or a location sensing device configured to sense an actual location of the watercraft to provide an actual location signal, a control device configured to control the position of the rudder unit, a control data input device configured to selectively provide the control device with a first mode signal that starts a first mode of the control device and a second mode signal that starts a second mode of the control device, the second mode signal being accompanied by a target azimuth signal indicative of a target azimuth of the watercraft or a target location signal indicative of a target location of the watercraft, the control device controlling the position of the rudder unit based upon the position command signal in the first mode, the control device controlling the position of the rudder unit such that an actual azimuth amount designated by the actual azimuth signal generally coincides with a target azimuth amount designated by the target azimuth signal in the second mode, and the control device starting the first mode in place of the second mode without the first mode signal if the position command signal changes while the control device controls the position of the rudder unit in the second mode.

18. A control method for controlling a position of a rudder of a watercraft comprising generating a position command signal indicative of a position of the rudder, either sensing an actual azimuth of the watercraft to generate an actual azimuth signal or sensing an actual location of the watercraft to generate an actual location signal, generating a first mode signal that starts a first mode, generating a second mode signal that starts a second mode, either generating a target azimuth signal indicative of a target azimuth of the watercraft or generating a target location signal indicative of a target location of the watercraft, controlling the position of the rudder based upon the position command signal in the first mode, controlling the position of the rudder such that an actual azimuth amount designated by the actual azimuth signal generally coincides with a target azimuth amount designated by the target azimuth signal, determining whether the position command signal changes while controlling the position of the rudder in the second mode, and starting the first mode in place of the second mode without the first mode signal if the determination is positive.

19. The control method as set forth in claim 18 additionally comprising holding the first mode when the first mode is started without the first mode signal.

20. The control method as set forth in claim 18 additionally comprising canceling the second mode signal afterwards when the first mode is started without the first mode signal.

21. The control method as set forth in claim 18 additionally comprising calculating a position control amount based upon the actual azimuth amount and the target azimuth amount, and controlling the position of the rudder using the position control amount in the second mode.

22. The control method as set forth in claim 21 additionally comprising calculating the target azimuth amount based upon an actual location amount designated by the actual location signal and a target location amount designated by the target location signal.

23. The control method as set forth in claim 18 additionally comprising determining whether the position control amount is greater than a preset control amount threshold, and controlling the rudder using the position control amount if the position control amount is equal to or less than the preset position control amount threshold or another position control amount that does not exceed the preset position control amount threshold if the position control amount is greater than the preset position control amount threshold.

24. The control method as set forth in claim 18 additionally comprising controlling the position of the rudder such that the actual azimuth amount gradually approaches the target azimuth amount.

25. The control method as set forth in claim 18 additionally comprising sensing an actual position of the rudder to generate an actual position signal, calculating a position control amount based upon a position command amount designated by the position command signal and an actual position amount designated by the actual position signal, and controlling the position of the rudder using the position control amount in the first mode.

26. The control method as set forth in claim 18 additionally comprising determining whether a difference between a position command amount designated by the position command signal and a position command reference amount is equal to or greater than a preset command threshold, the first mode started without the first mode signal when the difference is equal to or greater than the preset command threshold.

27. A control method for controlling a position of a rudder of a watercraft comprising generating a position command signal indicative of a position of the rudder, either sensing an actual azimuth of the watercraft to generate an actual azimuth signal or sensing an actual location of the watercraft to generate an actual location signal, generating a first mode signal that starts a first mode, generating a second mode signal that starts a second mode, either generating a target azimuth signal indicative of a target azimuth of the watercraft or generating a target location signal indicative of a target location of the watercraft, controlling the position of the rudder based upon the position command signal in the first mode, controlling the position of the rudder such that an actual azimuth designated by the actual azimuth signal generally coincides with a target azimuth amount designated by the target azimuth signal, determining whether the position command signal changes while the control device controls the position of the rudder in the second mode, and controlling the rudder based upon the position signal if the determination is positive.

* * * * *

UNITED STATES PATENT AND TRADEMARK OFFICE
CERTIFICATE OF CORRECTION

PATENT NO. : 6,868,317 B2  Page 1 of 1
APPLICATION NO. : 10/675340
DATED : March 15, 2005
INVENTOR(S) : Takashi Okuyama It is certified that error appears in the above-identified patent and that said Letters Patent is hereby corrected as shown below:

At column 3, line 60, please delete "computerimplemented" and insert therefore, -- computer-implemented --.

At column 14, line 35, after "NETWORK," please insert -- which Attorney's docket number is FS.20107US0A, --.

At column 21, line 3, please delete "La-LAd" and insert therefore, -- Lat-LAd --.

At column 24, line 42, please delete "neutral-position" and insert therefore, -- neutral position --.

At column 25, line 20, after "condition" delete "," and insert therefore, -- ; --.

At column 25, line 43, please delete "Azt" and insert therefore, -- AZt --.

At column 26, line 34, please delete "Azd" and insert therefore, -- AZd --.

At column 26, line 43, please delete "counterclockwise" and insert therefore, -- counter-clockwise --.

Signed and Sealed this

Twenty-sixth Day of December, 2006

JON W. DUDAS
*Director of the United States Patent and Trademark Office*